United States Patent
Jang

(10) Patent No.: US 11,189,822 B2
(45) Date of Patent: Nov. 30, 2021

(54) GRAPHITE PROTECTED ANODE ACTIVE MATERIAL PARTICLES FOR RECHARGEABLE LITHIUM BATTERIES

(71) Applicant: Global Graphene Group, Inc., Dayton, OH (US)

(72) Inventor: Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 177 days.

(21) Appl. No.: 16/238,079

(22) Filed: Jan. 2, 2019

(65) Prior Publication Data

US 2020/0212426 A1    Jul. 2, 2020

(51) Int. Cl.

| | |
|---|---|
| H01M 4/133 | (2010.01) |
| H01M 4/04 | (2006.01) |
| H01M 10/0525 | (2010.01) |
| C01B 32/225 | (2017.01) |
| H01M 4/1393 | (2010.01) |
| H01M 4/02 | (2006.01) |

(52) U.S. Cl.
CPC .......... *H01M 4/133* (2013.01); *C01B 32/225* (2017.08); *H01M 4/0471* (2013.01); *H01M 4/1393* (2013.01); *H01M 10/0525* (2013.01); H01M 2004/021 (2013.01)

(58) Field of Classification Search
CPC ............... H01M 4/133; H01M 4/0471; H01M 10/0525; H01M 4/1393; H01M 2004/021; H01M 4/483; H01M 4/583; H01M 4/587; H01M 4/625; H01M 4/1395; H01M 4/364; H01M 4/366; H01M 4/386; H01M 4/134; H01M 10/052; C01B 32/225; Y02E 60/10

USPC ......................................................... 429/213
See application file for complete search history.

(56) References Cited

U.S. PATENT DOCUMENTS

| | | |
|---|---|---|
| 2005/0136330 A1 | 6/2005 | Mao et al. |
| 2016/0043384 A1* | 2/2016 | Zhamu .................. H01M 4/366 429/231.4 |

(Continued)

FOREIGN PATENT DOCUMENTS

| | | |
|---|---|---|
| CN | 105047891 A | 11/2015 |
| WO | 2017034656 A1 | 3/2017 |
| WO | 2018140249 A1 | 8/2018 |

OTHER PUBLICATIONS

PCT/US20/12020 International Search Report and Written Opinion dated Apr. 29, 2020, 12 pages.

*Primary Examiner* — Gary D Harris

(57) ABSTRACT

Provided is an anode particulate or a solid mass of particulates for a lithium battery, the particulate comprising a graphite matrix and a single or a plurality of carbon foam-protected primary particles of an anode active material embedded or dispersed in said graphite matrix, wherein the primary particles of anode active material contain at least one porous particle having a surface pore, internal pore, or both surface and internal pores, having a pore volume of Vpp and a solid volume Va, the carbon foam contains pores having a pore volume Vp, and the volume ratio Vp/Va is from 0.1/1.0 to 5.0/1.0 or a total pore-to-solid volume ratio (Vp+Vpp)/Va is from 0.3/1.0 to 10/1.0 and wherein the carbon foam is physically or chemically connected to the graphite matrix and the primary anode particles. The carbon foam is preferably reinforced with a high-strength material.

32 Claims, 10 Drawing Sheets

(56) References Cited

U.S. PATENT DOCUMENTS

2016/0344035 A1 11/2016 Zhamu et al.
2017/0294687 A1 10/2017 Burshtain et al.

* cited by examiner

A. Polymer-coated anode active material particles

B. Graphite-embraced polymer-coated particles of anode active material

C. Graphite-embraced core of anode active material particles embedded in a carbon foam matrix

US 11,189,822 B2

GRAPHITE PROTECTED ANODE ACTIVE MATERIAL PARTICLES FOR RECHARGEABLE LITHIUM BATTERIES

FIELD OF THE INVENTION

The present invention relates generally to the field of lithium batteries and, in particular, to graphite-embraced, porous carbon matrix-protected anode active material particles for lithium batteries.

BACKGROUND

A unit cell or building block of a lithium-ion battery is typically composed of an anode current collector, an anode or negative electrode layer (containing an anode active material responsible for storing lithium therein, a conductive additive, and a resin binder), an electrolyte and porous separator, a cathode or positive electrode layer (containing a cathode active material responsible for storing lithium therein, a conductive additive, and a resin binder), and a separate cathode current collector. The electrolyte is in ionic contact with both the anode active material and the cathode active material. A porous separator is not required if the electrolyte is a solid-state electrolyte.

The binder in the binder layer is used to bond the anode active material (e.g. graphite or Si particles) and a conductive filler (e.g. carbon black or carbon nanotube) together to form an anode layer of structural integrity, and to bond the anode layer to a separate anode current collector, which acts to collect electrons from the anode active material when the battery is discharged. In other words, in the negative electrode (anode) side of the battery, there are typically four different materials involved: an anode active material, a conductive additive, a resin binder (e.g. polyvinylidine fluoride, PVDF, or styrene-butadiene rubber, SBR), and an anode current collector (typically a sheet of Cu foil). Typically the former three materials form a separate, discrete anode layer and the latter one forms another discrete layer.

The most commonly used anode active materials for lithium-ion batteries are natural graphite and synthetic graphite (or artificial graphite) that can be intercalated with lithium and the resulting graphite intercalation compound (GIC) may be expressed as $Li_xC_6$, where x is typically less than 1. The maximum amount of lithium that can be reversibly intercalated into the interstices between graphene planes of a perfect graphite crystal corresponds to x=1, defining a theoretical specific capacity of 372 mAh/g.

Graphite or carbon anodes can have a long cycle life due to the presence of a protective solid-electrolyte interface layer (SEI), which results from the reaction between lithium and the electrolyte (or between lithium and the anode surface/edge atoms or functional groups) during the first several charge-discharge cycles. The lithium in this reaction comes from some of the lithium ions originally intended for the charge transfer purpose. As the SEI is formed, the lithium ions become part of the inert SEI layer and become irreversible, i.e. these positive ions can no longer be shuttled back and forth between the anode and the cathode during subsequent charges/discharges. Therefore, it is desirable to use a minimum amount of lithium for the formation of an effective SEI layer. In addition to SEI formation, the irreversible capacity loss $Q_{ir}$ can also be attributed to graphite exfoliation caused by electrolyte/solvent co-intercalation and other side reactions.

In addition to carbon- or graphite-based anode materials, other inorganic materials that have been evaluated for potential anode applications include metal oxides, metal nitrides, metal sulfides, and the like, and a range of metals, metal alloys, and intermetallic compounds that can accommodate lithium atoms/ions or react with lithium. Among these materials, lithium alloys having a composition formula of $Li_aA$ (A is a metal or semiconductor element, such as Al and Si, and "a" satisfies 0<a≤5) are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, as schematically illustrated in FIG. 2(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.

To overcome the problems associated with such mechanical degradation, three technical approaches have been proposed:

(1) reducing the size of the active material particle, presumably for the purpose of reducing the total strain energy that can be stored in a particle, which is a driving force for crack formation in the particle. However, a reduced particle size implies a higher surface area available for potentially reacting with the liquid electrolyte to form a higher amount of SEI. Such a reaction is undesirable since it is a source of irreversible capacity loss.

(2) depositing the electrode active material in a thin film form directly onto a current collector, such as a copper foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area (even though the capacity per unit mass can be large). Such a thin film must have a thickness less than 100 nm to be more resistant to cycling-induced cracking, further diminishing the total lithium storage capacity and the lithium storage capacity per unit electrode surface area. Such a thin-film battery has very limited scope of application. A desirable and typical electrode thickness is from 100 μm to 200 μm. These thin-film electrodes (with a thickness of <500 nm or even <100 nm) fall short of the required thickness by three (3) orders of magnitude, not just by a factor of 3.

(3) using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nanoparticles. Presumably, the protective matrix provides a cushioning effect for particle expansion or shrinkage, and prevents the electrolyte from contacting and reacting with the electrode active material. Examples of high-capacity anode active particles are Si, Sn, and $SnO_2$. Unfortunately, when an active material particle, such as Si particle, expands (e.g. up to a volume expansion of 380%)

during the battery charge step, the protective coating is easily broken due to the mechanical weakness and/o brittleness of the protective coating materials. There has been no high-strength and high-toughness material available that is itself also lithium ion conductive.

It may be further noted that the coating or matrix materials used to protect active particles (such as Si and Sn) are carbon, sol gel graphite, metal oxide, monomer, ceramic, and lithium oxide. These protective materials are all very brittle, weak (of low strength), and/or non-conductive to lithium ions (e.g., ceramic or oxide coating). Ideally, the protective material should meet the following requirements: (a) The protective material must be lithium ion-conducting as well as initially electron-conducting (when the anode electrode is made) and be capable of preventing liquid electrolyte from being in constant contact with the anode active material particles (e.g. Si). (b) The protective material should also have high fracture toughness or high resistance to crack formation to avoid disintegration during cycling. (c) The protective material must be inert (inactive) with respect to the electrolyte, but be a good lithium ion conductor. (d) The protective material must not provide any significant amount of defect sites that irreversibly trap lithium ions. (e) The combined protective material-anode material structure must allow for an adequate amount of free space to accommodate volume expansion of the anode active material particles when lithiated. The prior art protective materials all fall short of these requirements. Hence, it was not surprising to observe that the resulting anode typically shows a reversible specific capacity much lower than expected. In many cases, the first-cycle efficiency is extremely low (mostly lower than 80% and some even lower than 60%). Furthermore, in most cases, the electrode was not capable of operating for a large number of cycles. Additionally, most of these electrodes are not high-rate capable, exhibiting unacceptably low capacity at a high discharge rate.

Due to these and other reasons, most of prior art composite electrodes and electrode active materials have deficiencies in some ways, e.g., in most cases, less than satisfactory reversible capacity, poor cycling stability, high irreversible capacity, ineffectiveness in reducing the internal stress or strain during the lithium ion insertion and extraction steps, and other undesirable side effects.

Complex composite particles of particular interest are a mixture of separate Si and graphite particles dispersed in a carbon matrix; e.g. those prepared by Mao, et al. ["Carbon-coated Silicon Particle Powder as the Anode Material for Lithium Batteries and the Method of Making the Same," US 2005/0136330 (Jun. 23, 2005)]. Also of interest are carbon matrix-containing complex nano Si (protected by oxide) and graphite particles dispersed therein, and carbon-coated Si particles distributed on a surface of graphite particles Again, these complex composite particles led to a low specific capacity or for up to a small number of cycles only. It appears that carbon by itself is relatively weak and brittle and the presence of micron-sized graphite particles does not improve the mechanical integrity of carbon since graphite particles are themselves relatively weak. Graphite was used in these cases presumably for the purpose of improving the electrical conductivity of the anode material. Furthermore, polymeric carbon, amorphous carbon, or pre-graphitic carbon may have too many lithium-trapping sites that irreversibly capture lithium during the first few cycles, resulting in excessive irreversibility.

In summary, the prior art has not demonstrated a material that has all or most of the properties desired for use as an anode active material in a lithium-ion battery. Thus, there is an urgent and continuing need for a new anode active material that enables a lithium-ion battery to exhibit a high cycle life, high reversible capacity, low irreversible capacity, small particle sizes (for high-rate capacity), and compatibility with commonly used electrolytes. There is also a need for a method of readily or easily producing such a material in large quantities.

Thus, it is a specific object of the present invention to meet these needs and address the issues associated the rapid capacity decay of a lithium battery containing a high-capacity anode active material.

SUMMARY OF THE INVENTION

The invention provides an anode particulate or multiple anode particulates for a lithium battery. The particulate or at least one of the multiple particulates comprises a graphite matrix and a single or a plurality of carbon foam-protected primary particles of an anode active material embedded or dispersed in the graphite matrix, wherein the primary particles of anode active material have a volume $V_a$, the carbon foam contains pores having a pore volume $V_p$, and the volume ratio $V_p/V_a$ is from 0.1/1.0 to 20/1.0 (preferably from 0.3/1.0 to 10/1.0 and most preferably from 0.5/1.0 to 5.0/1.0) and wherein the carbon foam is physically or chemically connected to the graphite matrix and the primary particles of the anode active material. The graphite encapsulating layer typically has a thickness from 35 nm to 35 µm, preferably thinner than 10 µm.

The primary particles of anode active material contain at least one porous particle having a surface pore, an internal pore, or both surface and internal pores. The porous primary particles have a pore volume of $V_{pp}$. Preferably, the particulate has a total pore-to-solid volume ratio $(V_p+V_{pp})/V_a$ from 0.3/1.0 to 20/1.0, more preferably from 0.5/1.0 to 10/1.0, and further more preferably from 1.0/1.0 to 5.0/1.0.

Although there is no theoretical upper limit to either the $V_p/V_a$ ratio or the $(V_{pp}+V_p)/V_a$ ratio, too large a ratio means too low an electrode packing density and, hence, a lower volumetric energy density of the resulting lithium cell. A practical upper limit for either the $V_p/V_a$ ratio or the $(V_{pp}+V_p)/V_a$ ratio is 20/1.0, more preferably 10/1.0, and most preferably 5.0/1.0.

In certain embodiments, the graphite matrix comprises expanded graphite flakes, natural graphite flakes, artificial graphite particles, exfoliated graphite worms, sol-gel graphite, polymer-derived graphite platelets (artificial graphite obtained by carbonizing and graphitizing a polymer such as polyimide), graphitized CVD carbon, or a combination thereof.

By definition, graphene or graphene sheets contain from 1 to 10 graphene planes stacked together via van der Waals forces; including single-layer graphene (containing only one graphene plane or hexagonal carbon atom plane) and few layer graphene (containing 2-10 graphene planes). Expanded flakes typically refer to graphite flakes having more than 10 graphene planes (>3.4 nm in thickness) and more typically refer to graphite flakes having more than 100 graphene planes (>34 nm in thickness), but less than 10 µm in thickness (more typically less than 1 µm in thickness). It is now well-known in the art and commonly accepted in science community that graphene and expanded graphite are two fundamentally different and patently distinct classes of materials. Both graphene and expanded graphite can contain up to 46% by weight of non-carbon atoms (typically <20%).

In certain embodiments, the graphite matrix further comprises a binder that bonds together the expanded graphite flakes, natural graphite flakes, artificial graphite particles, sol-gel graphite, polymer-derived graphite platelets, graphitized CVD carbon, or a combination thereof to prevent a direct contact between a liquid electrolyte and the primary particles of the anode active material. The binder may comprise a material selected from a polymer (including a conducting or non-conducting polymer), polymeric carbon or carbonized resin, amorphous carbon, pitch (e.g. coal tar pitch or petroleum pitch), CVD carbon, metal, or a combination thereof.

In some preferred embodiments, the porous carbon matrix (carbon foam structure) is reinforced with a high-strength material selected from carbon nanotubes (single-walled or multi-walled CNTs), carbon nanofibers (e.g. vapor-grown CNFs or carbonized electron-spun polymer nanofibers), carbon or graphite fibers, polymer fibrils (e.g. the aromatic polyamide fibrils extracted from aromatic polyamide fibers, such as Kevlar fibers), graphene sheets, expanded graphite flakes, glass fibers, ceramic fibers, metal filaments or metal nanowires, whiskers (e.g. carbon whiskers, graphite whiskers, ceramic whiskers), or a combination thereof. These high-strength materials may be dispersed into a polymer to make a polymer composite prior to being combined with or during the combination with the anode active material particles.

The invention also provides an anode particulate for a lithium battery, wherein the particulate does not contain the encapsulating graphite matrix; but, the carbon foam is reinforced with a high-strength material. In certain embodiments, the particulate comprising a single or a plurality of carbon foam-protected primary particles of an anode active material, wherein the primary particles of anode active material have a volume Va, the carbon foam contains pores having a pore volume Vp, and the volume ratio Vp/Va is from 0.1/1.0 to 5.0/1.0 and wherein the carbon foam is reinforced with a high-strength material selected from carbon nanotubes, carbon nanofibers, carbon or graphite fibers, graphene sheets, expanded graphite flakes, polymer fibrils, glass fibers, ceramic fibers, metal filaments or metal nanowires, whiskers, or a combination thereof. The primary particles of anode active material contain at least one porous particle having a surface pore, an internal pore, or both surface and internal pores. The porous primary particles have a pore volume of Vpp. Preferably, the particulate has a total pore-to-solid volume ratio (Vp+Vpp)/Va from 0.3/1.0 to 5.0/1.0, more preferably from 0.5/1.0 to 4.0/1.0, and further more preferably from 1.0/1.0 to 4.0/1.0.

The anode active material may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li having at least 60% by weight of lithium element therein; and (h) combinations thereof.

The Li alloy contains from 0.1% to 10% by weight of a metal element selected from Zn, Ag, Au, Mg, Ni, Ti, Fe, Co, V, or a combination.

In certain embodiments, the anode active material contains a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, lithium titanate, or a combination thereof, wherein x=1 to 2.

The anode active material is preferably in a form of nanoparticle, nanowire, nanofiber, nanotube, nanosheet, nanobelt, nanoribbon, nanodisc, nanoplatelet, or nanohorn having a thickness or diameter from 0.5 nm to 100 nm.

In certain embodiments, at least one of the anode active material particles is coated with a layer of carbon or graphene prior to being encapsulated by a precursor to the carbon foam matrix.

The present invention also provides a powder mass of anode particulates containing the herein invented anode particulate. Also provided is a battery anode containing the invented particulate described above. The invention further provides a battery containing such a battery anode. The battery may be a lithium-ion battery, lithium metal secondary battery, lithium-sulfur battery, lithium-air battery, or lithium-selenium battery.

The invention also provides a method of producing multiple particulates containing the aforementioned anode particulate. The method comprises providing multiple polymer-coated primary particles of an anode active material and then either thermally converting the polymer into carbon foam and embracing the carbon foam-protected primary anode particles with a graphite matrix or embracing polymer-coated anode particles with a graphite matrix and thermally converting the polymer into a carbon foam. The polymer comprises a carbon precursor material having a carbon yield from 0.1% to 70% by weight, preferably from 1% to 25% (low carbon-yield precursor, such as PE, PVC, and PET).

Thus, in certain embodiments, the method comprises: (a) providing multiple polymer-coated primary particles of an anode active material, wherein the polymer comprises a carbon precursor material having a carbon yield from 0.1% to 70% by weight; (b) combining the polymer-coated anode active material particles with a graphite matrix material to produce graphite matrix-embraced polymer-coated anode active material particles; and (c) thermally converting the polymer in the polymer-coated particles into a porous carbon matrix or carbon foam to obtain the multiple particulates.

Preferably, step (b) comprises operating (i) an air-jet milling procedure to embrace the polymer-coated anode active material particles with natural flake graphite matrix material or (ii) a ball milling procedure to embrace the polymer-coated anode active material particles with expanded graphite flakes or exfoliated graphite worms. It may be noted that expanded graphite flakes are typically produced by using mechanical shearing means (e.g. disperser machine, mechanical shearing machine, rotating-blade mixer, ultrasonicator, air jet mill, etc.) to break up the exfoliated graphite worms.

In certain alternative embodiments, the method comprises: (A) providing multiple polymer-coated primary particles of an anode active material, wherein the polymer comprises a carbon precursor material having a carbon yield from 0.1% to 70% by weight; (B) thermally converting the polymer in the polymer-coated particles into a porous carbon matrix or carbon foam to obtain carbon foam-protected primary particles of an anode active material; and (C) combining the carbon foam-protected primary particles of anode active material particles with a graphite matrix material to produce the multiple particulates. In some embodiments, step (c) comprises operating a ball milling procedure to embrace the carbon foam-protected primary particles of anode active material with expanded graphite flakes.

In the aforementioned methods, the ball milling operating procedure may comprise operating an apparatus selected from a vibratory ball mill, planetary ball mill, high energy mill, basket mill, agitator ball mill, cryogenic ball mill, microball mill, tumbler ball mill, continuous ball mill, stirred ball mill, pressurized ball mill, attritor, plasma-assisted ball mill, freezer mill, vibratory sieve, bead mill, nanobead mill, ultrasonic homogenizer mill, centrifugal planetary mixer, vacuum ball mill, or resonant acoustic mixer.

It may be noted that the terms "polymer-protected" and "polymer-coated" are herein used interchangeably. The polymer-protected anode active material particles includes secondary particles composed of single and multiple anode active material particles that are fully embraced by a polymer coating or embedded in a polymer matrix. In some embodiments, the polymer-coated anode active material particles comprise a polymer selected from a thermoplastic, thermoset resin, rubber or elastomer, filled or reinforced polymer, interpenetrating polymer network, biopolymer (including all natural polymers), pitch (e.g. coal tar pitch, petroleum pitch, mesophase pitch, etc.), sugar (e.g. sucrose), starch, or a combination thereof.

The method may further comprise a step of incorporating the graphite matrix-encapsulated, porous carbon foam-protected anode active material particles into a battery electrode.

In some embodiments, the particles of anode active material contain prelithiated particles. In other words, before the electrode active material particles (such as Si or $SnO_2$) are coated by the polymer (or embedded in a polymer matrix) and embraced by graphene sheets, these particles have been previously intercalated with Li ions (e.g. via electrochemical charging) up to an amount of 0.1% to 30% by weight of Li.

In some embodiments, prior to being coated with (or being embedded in) a polymer, the particles of anode active material contain particles pre-coated with a coating layer of a conductive material selected from carbon, pitch, carbonized resin, a conductive polymer, a conductive organic material, a metal coating, a metal oxide shell, graphene sheets, or a combination thereof. The coating layer thickness is preferably in the range from 1 nm to 20 µm, preferably from 10 nm to 10 µm, and further preferably from 100 nm to 1 µm.

In some embodiments, the particles of anode active material contain particles that are pre-coated with a carbon precursor material selected from a coal tar pitch, petroleum pitch, mesophase pitch, polymer, organic material, or a combination thereof so that the carbon precursor material resides between surfaces of the anode active material particles and the polymer coating or matrix. This carbon precursor, along with the polymer coating, gets carbonized and becomes part of the porous carbon structure or carbon foam during the subsequent pyrolyzation or heat-treating procedure.

In some embodiments, the polymer coated on the anode active material particles (or the polymer in which anode active material particles are embedded) contains a blowing agent (foaming agent), a reinforcement material, or both that are dispersed therein. The reinforcement material may contain a high-strength material selected from carbon nanotubes (single-walled or multi-walled CNTs), carbon nanofibers (e.g. vapor-grown CNFs or carbonized electron-spun polymer nanofibers), carbon or graphite fibers, polymer fibrils (e.g. the aromatic polyamide fibrils extracted from aromatic polyamide fibers, such as Kevlar fibers), graphene sheets, expanded graphite flakes, glass fibers, ceramic fibers, metal filaments or metal nanowires, whiskers (e.g. carbon whiskers, graphite whiskers, ceramic whiskers), or a combination thereof.

The multiple polymer-coated anode active material particles may be produced by operating a procedure selected from pan-coating, air-suspension coating, centrifugal extrusion, vibration-nozzle encapsulation, spray-drying, coacervation-phase separation, interfacial polycondensation and interfacial cross-linking, in-situ polymerization, matrix polymerization, extrusion and pelletizing, or a combination thereof.

In some embodiments, the particles of solid anode active material contain particles pre-coated with a sacrificial material selected from a metal, pitch, polymer, organic material, or a combination thereof in such a manner that the sacrificial material resides between surfaces of particles of solid electrode active material and the graphene sheets, and the method further contains a step of partially or completely removing the sacrificial material to form additional empty spaces between surfaces of the solid electrode active material particles and the graphene sheets.

In some embodiments, the method further comprises a step of exposing the graphene-embraced electrode active material to a liquid or vapor of a conductive material that is conductive to electrons and/or ions of lithium.

The particles of anode active material may be selected from the group consisting of: (A) lithiated and un-lithiated silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (B) lithiated and un-lithiated alloys or intermetallic compounds of Si, Ge, Sn, Pb, Sb, Bi, Zn, Al, Ti, Ni, Co, or Cd with other elements; (C) lithiated and un-lithiated oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites; (D) lithiated and un-lithiated salts and hydroxides of Sn; (E) lithium titanate, lithium manganate, lithium aluminate, lithium-containing titanium oxide, lithium transition metal oxide; and combinations thereof.

In some embodiments, the anode active material particles include powder, flakes, beads, pellets, spheres, wires, fibers, filaments, discs, ribbons, or rods, having a diameter or thickness from 2 nm to 20 µm. Preferably, the diameter or thickness is from 10 nm to 100 nm.

DETAILED DESCRIPTION OF PREFERRED EMBODIMENTS

A lithium-ion battery cell is typically composed of an anode current collector (e.g. Cu foil), an anode or negative electrode active material layer (i.e. anode layer typically containing particles of an anode active material, conductive additive, and binder), a porous separator and/or an electrolyte component, a cathode or positive electrode active material layer (containing a cathode active material, conductive additive, and resin binder), and a cathode current collector (e.g. Al foil). More specifically, the anode layer is composed of particles of an anode active material (e.g. graphite, Sn, $SnO_2$, or Si), a conductive additive (e.g. carbon black particles), and a resin binder (e.g. SBR or PVDF). This anode layer is typically 50-300 μm thick (more typically 100-200 μm) to give rise to a sufficient amount of current per unit electrode area.

Figure 2A:
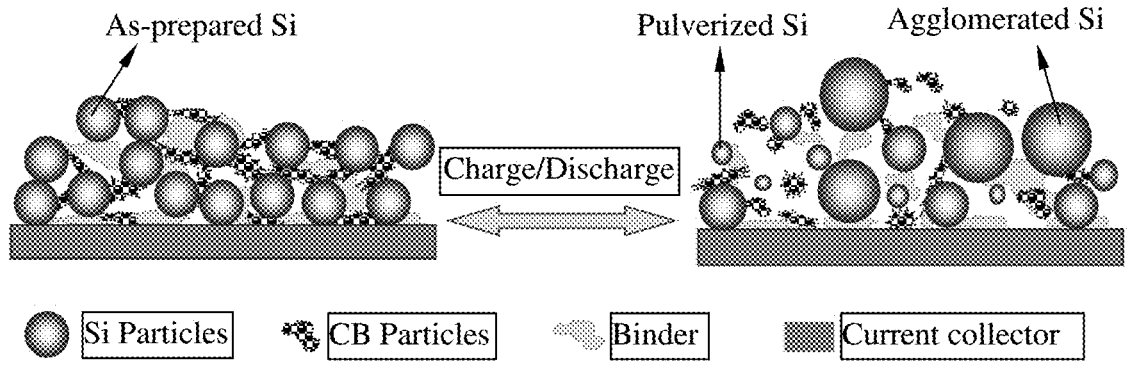
FIG. 2(A) Schematic illustrating the notion that expansion of Si particles, upon lithium intercalation during charging of a prior art lithium-ion battery, can lead to pulverization of Si particles, interruption of the conductive paths formed by the conductive additive, and loss of contact with the current collector.

In order to obtain a higher energy density cell, the anode can be designed to contain higher-capacity anode active materials having a composition formula of $Li_aA$ (A is a metal or semiconductor element, such as Al and Si, and "a" satisfies 0<a≤5). These materials are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, as discussed in the Background section, there are several problems associated with the implementation of these high-capacity anode active materials:

1) As schematically illustrated in FIG. 2(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.

2) The approach of using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nanoparticles, has failed to overcome the capacity decay problem. Presumably, the protective matrix provides a cushioning effect for particle expansion or shrinkage, and prevents the electrolyte from contacting and reacting with the electrode active material. Unfortunately, when an active material particle, such as Si particle, expands (e.g. up to a volume expansion of 380%) during the battery charge step, the protective coating is easily broken due to the mechanical weakness and/or brittleness of the protective coating materials. There has been no high-strength and high-toughness material available that is itself also lithium ion conductive.

3) The approach of using a core-shell structure (e.g. Si nanoparticle encapsulated in a carbon or $SiO_2$ shell) also has not solved the capacity decay issue. As illustrated in upper portion of FIG. 2(B), a non-lithiated Si particle can be encapsulated by a carbon shell to form a core-shell structure (Si core and carbon or $SiO_2$ shell in this example). As the lithium-ion battery is charged, the anode active material (carbon- or $SiO_2$-encapsulated Si particle) is intercalated with lithium ions and, hence, the Si particle expands. Due to the brittleness of the encapsulating shell (carbon), the shell is broken into segments, exposing the underlying Si to electrolyte and subjecting the Si to undesirable reactions with electrolyte during repeated charges/discharges of the battery.

These reactions continue to consume the electrolyte and reduce the cell's ability to store lithium ions.

Figure 2B:
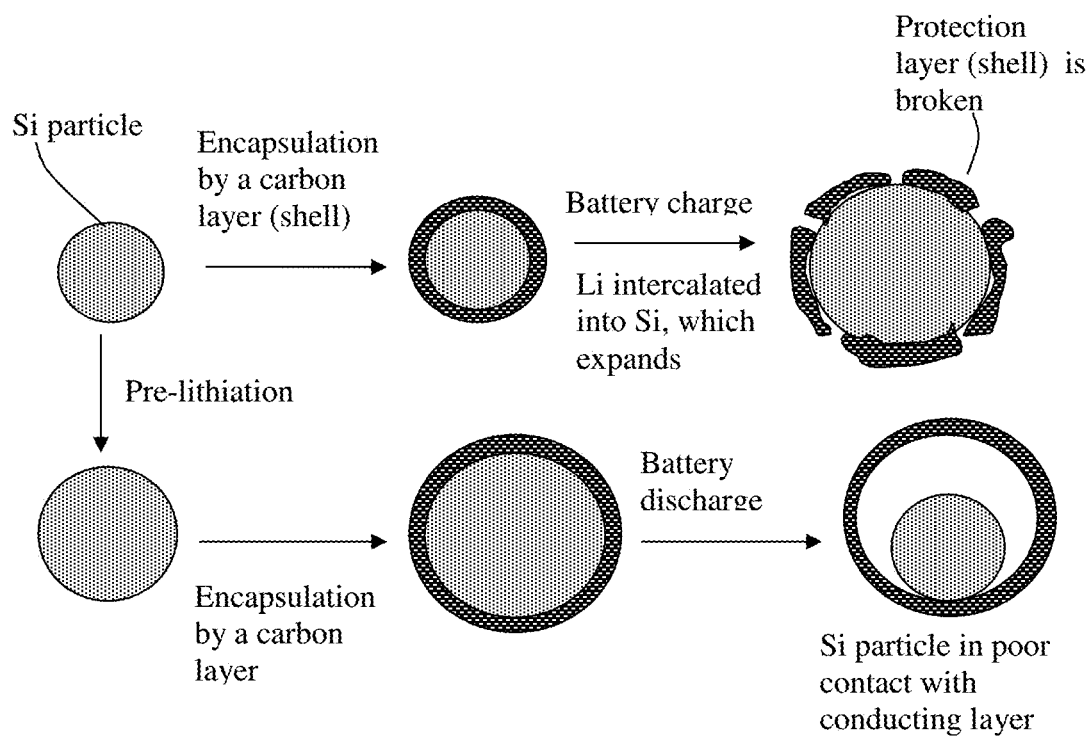
FIG. 2(B) illustrates the issues associated with prior art anode active material; for instance, a non-lithiated Si particle encapsulated by a protective shell (e.g. carbon shell) in a core-shell structure inevitably leads to breakage of the shell and that a prelithiated Si particle encapsulated with a protective layer leads to poor contact between the contracted Si particle and the rigid protective shell during battery discharge.

4) Referring to the lower portion of FIG. 2(B), wherein the Si particle has been prelithiated with lithium ions; i.e. has been pre-expanded in volume. When a layer of carbon (as an example of a protective material) is encapsulated around the prelithiated Si particle, another core-shell structure is formed. However, when the battery is discharged and lithium ions are released (de-intercalated) from the Si particle, the Si particle contracts, leaving behind a large gap between the protective shell and the Si particle. Such a configuration is not conducive to lithium intercalation of the Si particle during the subsequent battery charge cycle due to the gap and the poor contact of Si particle with the protective shell (through which lithium ions can diffuse). This would significantly curtail the lithium storage capacity of the Si particle particularly under high charge rate conditions.

In other words, there are several conflicting factors that must be considered concurrently when it comes to the design and selection of an anode active material in terms of material type, shape, size, porosity, and electrode layer thickness. Thus far, there has been no effective solution offered by any prior art teaching to these conflicting problems. We have solved these challenging issues that have troubled battery designers and electrochemists alike for more than 30 years by developing the approach of graphene-encapsulated highly porous carbon structure particulates (secondary particles) each comprising one or multiple primary particles of an anode active material dispersed in the porous carbon structure (or carbon foam). The pores in the carbon foam can accommodate the volume expansion of the primary particle(s) of the anode active material. The presence of embracing graphene sheets enables the formation of a porous carbon structure between these graphene sheets and primary anode particles (e.g. Si and $SiO_x$ particles, 0<x<2.0), derived from carbonization of the polymer matrix or coating that embeds the anode primary particles. Surprisingly, without these externally wrapped graphene sheets, the polymer coating or matrix tends to form solid (relatively pore-free) carbon material when the polymer is pyrolyzed.

The invention provides an anode particulate or multiple anode particulates for a lithium battery. The particulate or at least one of the multiple particulates comprises a graphite matrix and a single or a plurality of carbon foam-protected primary particles of an anode active material embedded or dispersed in the graphite matrix, wherein the primary particles of anode active material have a solid volume Va and pore volume Vpp, the carbon foam contains pores having a pore volume Vp, and the volume ratio Vp/Va is from 0.1/1.0 to 20/1.0 or the total pore-to-solid volume ratio (Vp+Vpp)/Va is from 0.3/1.0 to 20/1.0, and wherein the carbon foam is physically or chemically connected to the graphite matrix and the primary particles of the anode active material. The graphite encapsulating layer typically has a thickness from 35 nm to 35 μm, preferably thinner than 10 μm.

The primary particles of anode active material contain at least one porous particle having a surface pore, an internal pore, or both surface and internal pores. The porous primary particles have a pore volume of Vpp. Preferably, the particulate has a total pore-to-solid volume ratio (Vp+Vpp)/Va from 0.4/1.0 to 10/1.0, more preferably from 0.5/1.0 to 5.0/1.0, and further more preferably from 1.5/1.0 to 4.0/1.0.

The invention also provides an anode particulate for a lithium battery, wherein the particulate does not contain the encapsulating graphite matrix, but the carbon foam is reinforced with a high-strength material. In certain embodiments, the particulate comprises a single or a plurality of carbon foam-protected porous primary particles of an anode active material, wherein the porous primary particles of anode active material in the particulate(s) have a solid volume Va and a pore volume Vpp, the carbon foam contains pores having a pore volume Vp, and the volume ratio Vp/Va is from 0.1/1.0 to 5.0/1.0 or the total pore-to-solid volume ratio (Vp+Vpp)/Va is from 0.3/1.0 to 5.0/1.0, and wherein the carbon foam is reinforced with a high-strength material selected from carbon nanotubes, carbon nanofibers, carbon or graphite fibers, graphene sheets, expanded graphite flakes, polymer fibrils, glass fibers, ceramic fibers, metal filaments or metal nanowires, whiskers, or a combination thereof.

The primary particles of anode active material contain at least one porous particle having a surface pore, an internal pore, or both surface and internal pores. The porous primary particles have a pore volume of Vpp. Preferably, the particulate has a total pore-to-solid volume ratio (Vp+Vpp)/Va from 0.4/1.0 to 5.0/1.0, more preferably from 1.0/1.0 to 4.0/1.0, and further more preferably from 1.5/1.0 to 4.0/1.0.

Although there is no theoretical upper limit to either the Vp/Va ratio or the (Vpp+Vp)/Va ratio, too large a ratio means too low an electrode packing density and, hence, a lower volumetric energy density of the resulting lithium cell. A practical upper limit for either the Vp/Va ratio or the (Vpp+Vp)/Va ratio is 20/1.0, more preferably 10/1.0, and most preferably 5.0/1.0.

In certain embodiments, the graphite matrix comprises expanded graphite flakes, natural graphite flakes, artificial graphite particles, exfoliated graphite worms, sol-gel graphite, polymer-derived graphite platelets (artificial graphite obtained by carbonizing and graphitizing a polymer such as polyimide), graphitized CVD carbon, or a combination thereof.

In certain embodiments, the graphite matrix further comprises a binder that bonds together the expanded graphite flakes, natural graphite flakes, artificial graphite particles, sol-gel graphite, polymer-derived graphite platelets, graphitized CVD carbon, or a combination thereof to prevent a direct contact between a liquid electrolyte and the primary particles of the anode active material. The binder may comprise a material selected from a polymer (including a conducting or non-conducting polymer), polymeric carbon or carbonized resin, amorphous carbon, pitch (e.g. coal tar pitch or petroleum pitch), CVD carbon, metal, or a combination thereof.

In some preferred embodiments, the porous carbon matrix (carbon foam structure) is reinforced with a high-strength material selected from carbon nanotubes (single-walled or multi-walled CNTs), carbon nanofibers (e.g. vapor-grown CNFs or carbonized electron-spun polymer nanofibers), carbon or graphite fibers, polymer fibrils (e.g. the aromatic polyamide fibrils extracted from aromatic polyamide fibers, such as Kevlar fibers), graphene sheets, expanded graphite flakes, glass fibers, ceramic fibers, metal filaments or metal nanowires, whiskers (e.g. carbon whiskers, graphite whiskers, ceramic whiskers), or a combination thereof. These high-strength materials may be dispersed into a polymer to make a polymer composite prior to being combined with or during the combination with the anode active material particles.

Preferably, the anode active material is a high-capacity anode active material having a specific lithium storage capacity greater than 372 mAh/g (which is the theoretical capacity of graphite).

Figure 3A:
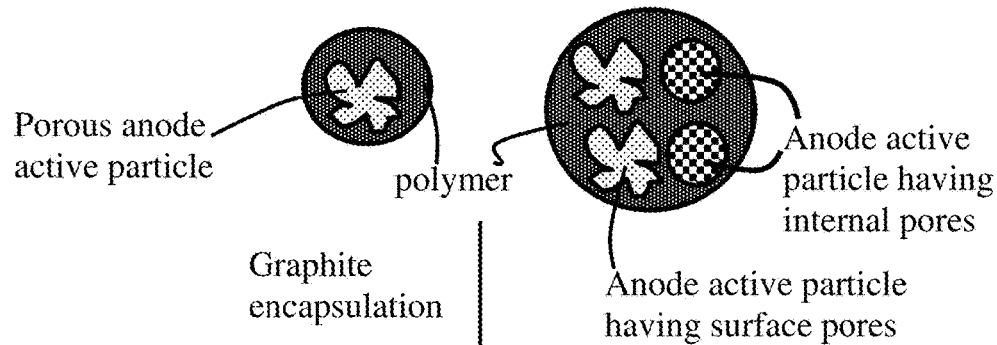
FIG. 3(A) A diagram showing the presently invented process for producing graphite matrix-embraced, carbon foam-protected anode active material particles.
Figure 3A:
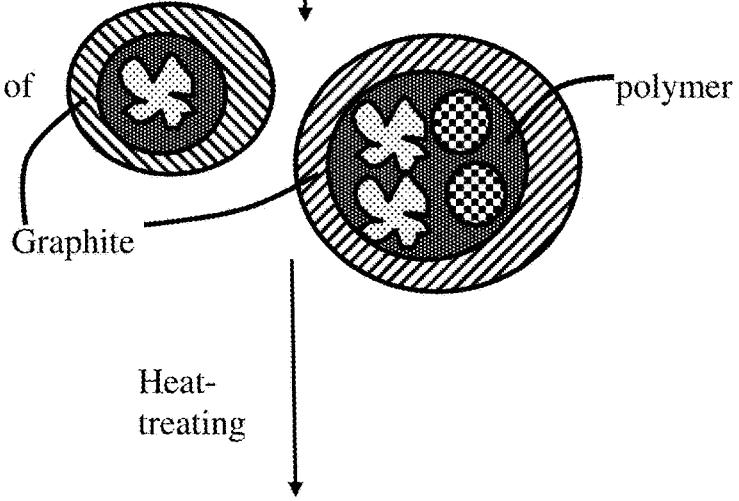
Figure 3A:
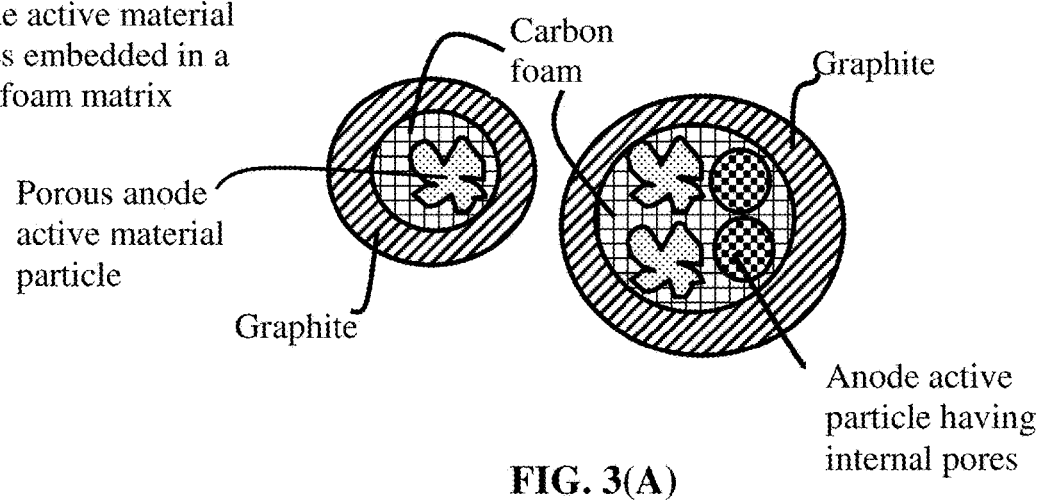
Figure 3B:
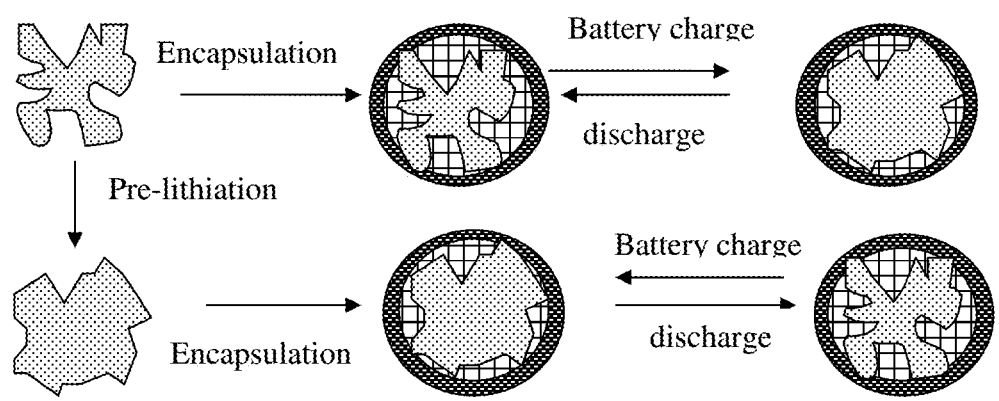
FIG. 3(B) Schematic of the presently invented encapsulated primary particles of an anode active material (prelithiated or unlithiated). The primary particles are porous having free space to expand into without straining or stressing the encapsulating shell. Although only one single porous primary particle is shown, multiple porous primary particles may be included in the core region encapsulated by a conducting shell.
Figure 3C:
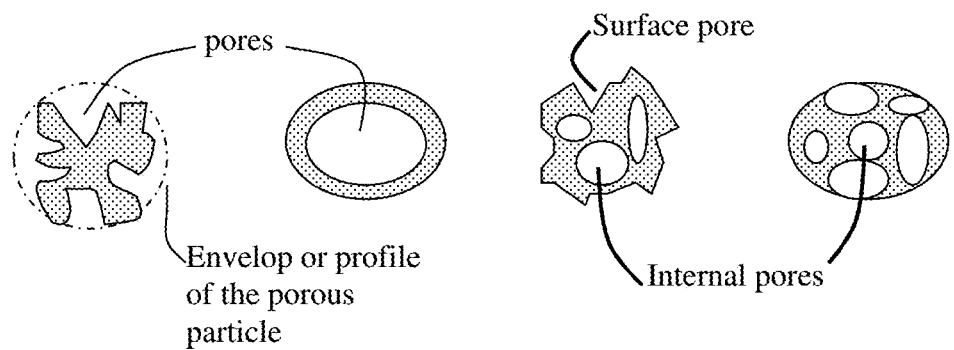
FIG. 3(C) Some examples of porous primary particles of an anode active material.
Figure 4:
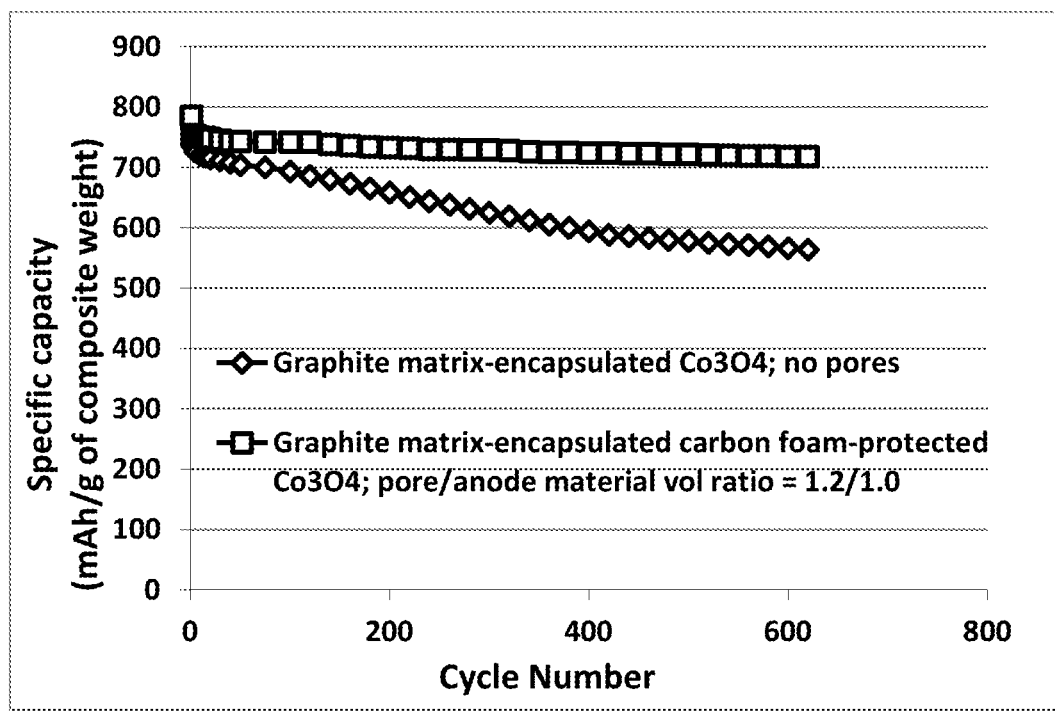
FIG. 4 The charge-discharge cycling behaviors of 2 lithium cells featuring $Co_3O_4$ particle-based anodes: one cell containing graphite matrix-embraced $Co_3O_4$ particles (no carbon foam connecting graphite layer and anode active particles; substantially no pores) and the other cell containing graphite matrix-encapsulated, carbon foam-protected $Co_3O_4$ particles (having a pore-to-anode particle volume ratio of 1.3/1.0).

The primary anode active material particles are preferably porous, having surface pores or internal pores, as schematically illustrated in FIG. 3(A), FIG. 3(B) and FIG. 4. The production methods of porous solid particles are well-known in the art. For instance, the production of porous Si particles may be accomplished by etching particles of a Si—Al alloy using HCl solution (to remove the Al element leaving behind pores) or by etching particles of a Si—$SiO_2$ mixture using HF solution (by removing $SiO_2$ to create pores).

Porous $SnO_2$ nanoparticles may be synthesized by a modified procedure described by Gurunathan et al [P. Gurunathan, P. M. Ette and K. Ramesha, ACS *Appl. Mater. Inter.*, 6 (2014) 16556-16564]. In a typical synthesis procedure, 8.00 g of $SnCl_2.6H_2O$, 5.20 g of resorcinol and 16.0 mL of 37% formaldehyde solution were mixed in 160 mL of $H_2O$ for about 30 minutes. Subsequently, the solution is sealed in a 250 mL round-bottom flask and kept in water bath at 80° C. for 4 hours. The resulting red gel is dried at 80° C. in an oven and calcined at 700° C. for 4 hours in $N_2$ and air atmosphere in sequence. Finally, the obtained white $SnO_2$ may be mechanically ground into finer powder for 30-60 minutes in mortar.

All types of porous anode active material particles may be produced by depositing the anode active material onto surfaces or into pores of a sacrificial material structure, followed by removing the sacrificial material. Such a deposition can be conducted using CVD, plasma-enhanced CVD, physical vapor deposition, sputtering, solution deposition, melt impregnation, chemical reaction deposition, etc.

This amount of pore volume inside the particulate (in the core portion, including the surface/internal pores of a primary particle and the pores that are not part of a primary particle) provides empty space to accommodate the volume expansion of the anode active material so that the thin encapsulating layer would not significantly expand (not to exceed 50% volume expansion of the particulate) when the lithium battery is charged. Preferably, the particulate does not increase its volume by more than 20%, further preferably less than 10% and most preferably by approximately 0% when the lithium battery is charged. This can be accomplished by making the ratio of total pore volume-to-solid anode particle volume to be in the range from 0.3/1.0 to 4.0/1.0. The total pore volume includes the pores associated with a primary particle and those pores not part of a primary particle. Such a constrained volume expansion of the particulate would not only reduce or eliminate the volume expansion of the anode electrode but also reduce or eliminate the issue of repeated formation and destruction of a solid-electrolyte interface (SEI) phase. We have discovered that this strategy surprisingly results in significantly reduced battery capacity decay rate and dramatically increased charge/discharge cycle numbers. These results are unexpected and highly significant with great utility value.

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nanofiber. In other words, graphene planes (hexagonal lattice structure of carbon atoms) constitute a significant portion of a graphite particle.

Figure 1:
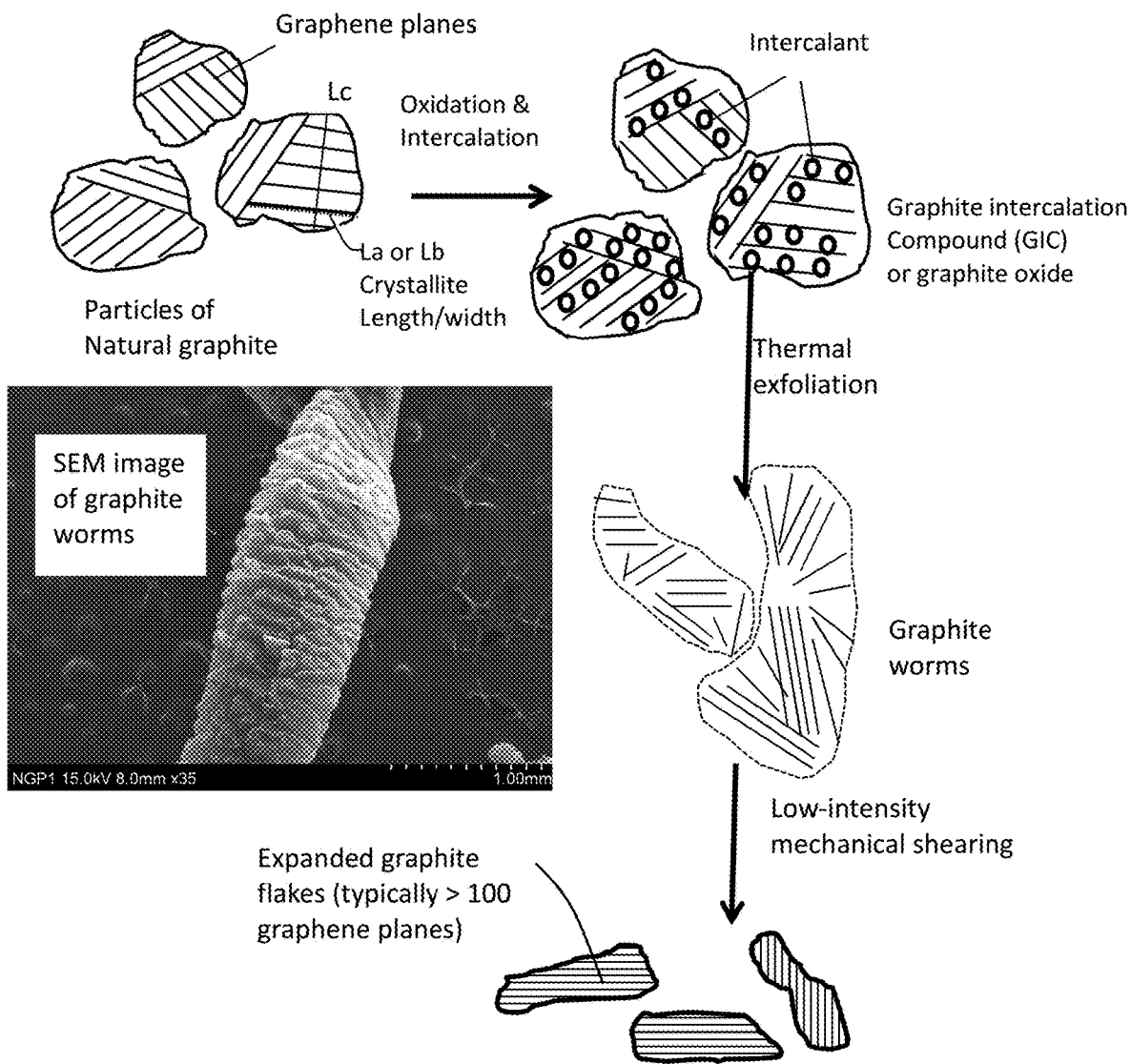
FIG. 1 Schematic of a procedure for producing exfoliated graphite worms, which are then subjected to a mechanical shearing treatment to obtain expanded graphite flakes. Expanded graphite flakes are not exfoliated graphite or graphite worms.

As illustrated in FIG. 1, the processes for production of exfoliated graphite worms and subsequently separated expanded graphite flakes typically involve immersing natural or artificial graphite powder in a mixture of concentrated sulfuric acid, nitric acid, and an oxidizer, such as potassium permanganate or sodium perchlorate. It typically requires 5-120 hours to complete the chemical intercalation/oxidation reaction. Once the reaction is completed, the slurry is subjected to repeated steps of rinsing and washing with water and then subjected to drying treatments to remove water. The dried powder is commonly referred to as graphite intercalation compound (GIC) or graphite oxide (GO). This GO/GIC is then subjected to a thermal shock treatment, which is most typically accomplished by exposing the GIC/GO to a furnace pre-set at a temperature of typically 800-1200° C. (more typically 950-1050° C.). This thermal shock operation typically leads to the formation of exfoliated graphite worms. A graphite worm is a bulk graphite entity that is composed of interconnected graphite flakes having large spaces between flakes. The flakes are typically composed of >100 graphene planes (>35 nm in thickness) and they are interconnected together to form a fluffy, worm-like morphology (please see the SEM image inserted in FIG. 1). When subjected to low-intensity mechanical shearing, graphite worms can be broken up into separated/isolated expanded graphite flakes. High-intensity mechanical shearing can lead to the formation of graphene platelets instead.

The invention also provides a method of producing multiple particulates containing the aforementioned anode particulate. The method comprises providing multiple polymer-coated primary particles of an anode active material and then either thermally converting the polymer into carbon foam and embracing the carbon foam-protected primary anode particles with a graphite matrix or embracing polymer-coated anode particles with a graphite matrix and thermally converting the polymer into a carbon foam.

Thus, in certain embodiments, the method comprises: (a) providing multiple polymer-coated primary particles of an anode active material; (b) combining the polymer-coated anode active material particles with a graphite matrix material to produce graphite matrix-embraced polymer-coated anode active material particles; and (c) thermally converting the polymer in the polymer-coated particles into a porous carbon matrix or carbon foam to obtain the multiple particulates.

As will be further discussed later, step (a) may include operating a procedure selected from pan-coating, air-suspension coating, centrifugal extrusion, vibration-nozzle encapsulation, spray-drying, coacervation-phase separation, interfacial polycondensation and interfacial cross-linking, in-situ polymerization, matrix polymerization, extrusion and pelletizing, or a combination thereof to produce said multiple polymer-coated primary particles of an anode active material.

Preferably, step (b) comprises operating (i) an air-jet milling procedure to embrace the polymer-coated anode active material particles with natural flake graphite matrix material or (ii) a ball milling procedure to embrace the polymer-coated anode active material particles with expanded graphite flakes or exfoliated graphite worms. It may be noted that expanded graphite flakes are typically produced by using mechanical shearing means (e.g. disperser machine, mechanical shearing machine, rotating-blade mixer, ultrasonicator, air jet mill, etc.) to break up the exfoliated graphite worms. In the ball milling procedure of embracing polymer-protected anode active material particles with graphite worms or expanded graphite flakes, the particles of ball-milling media may be selected from ceramic particles (e.g. $ZrO_2$ or non-$ZrO_2$-based metal oxide particles), metal particles, polymer beads, glass particles, or a combination thereof.

The resulting graphite-embraced polymer-protected particles are then subjected to a heat treatment to carbonize the polymer component and convert polymer into a porous carbon structure or carbon foam. The encapsulating graphite flakes appear to be capable of actively promoting the formation of a foamed carbon structure, rather than an empty space between the graphite matrix and a solid carbon structure, surrounding the anode active material particles.

In certain alternative embodiments, the method comprises: (A) providing multiple polymer-coated primary particles of an anode active material; (B) thermally converting the polymer in the polymer-coated particles into a porous carbon matrix or carbon foam to obtain carbon foam-protected primary particles of an anode active material; and (C) combining the carbon foam-protected primary particles of anode active material particles with a graphite matrix material to produce the multiple particulates. In some embodiments, step (c) comprises operating a ball milling procedure to embrace the carbon foam-protected primary particles of anode active material with expanded graphite flakes.

In the aforementioned methods, the ball milling operating procedure may comprise operating an apparatus selected from a vibratory ball mill, planetary ball mill, high energy mill, basket mill, agitator ball mill, cryogenic ball mill, microball mill, tumbler ball mill, continuous ball mill, stirred ball mill, pressurized ball mill, attritor, plasma-assisted ball mill, freezer mill, vibratory sieve, bead mill, nanobead mill, ultrasonic homogenizer mill, centrifugal planetary mixer, vacuum ball mill, or resonant acoustic mixer.

In certain preferred embodiments, the protecting polymer (the polymer that is embedded with anode active material particles or the polymer that coats/embraces the anode active material particles) contains a blowing agent (foaming agent).

A blowing agent or foaming agent is a substance which is capable of producing a cellular or foamed structure via a foaming or pore-forming process in a variety of materials that undergo hardening or phase transition, such as polymers (plastics and rubbers). Blowing agents or related pore-forming mechanisms to create pores or cells (bubbles) in a structure for producing a porous or cellular material, can be classified into the following groups:

(a) Physical blowing agents: e.g. hydrocarbons (e.g. pentane, isopentane, cyclopentane), chlorofluorocarbons (CFCs), hydrochlorofluorocarbons (HCFCs), and liquid $CO_2$. The bubble/foam-producing process is endothermic, i.e. it needs heat (e.g. from a melt process or the chemical exotherm due to cross-linking), to volatize a liquid blowing agent.

(b) Chemical blowing agents: e.g. isocyanate, azo-, hydrazine and other nitrogen-based materials (for thermoplastic and elastomeric foams), sodium bicarbonate (e.g. baking soda, used in thermoplastic foams). Here gaseous products and other by-products are formed by a chemical reaction, promoted by process or a reacting polymer's exothermic heat. Since the blowing reaction involves forming low molecular weight compounds that act as the blowing gas, additional exothermic heat is also released. Powdered titanium hydride is used as a foaming agent in the production of metal foams, as it decomposes to form titanium and hydrogen gas at elevated temperatures. Zirconium (II) hydride is used for the same purpose. Once formed the low molecular weight compounds will never revert to the original blowing agent(s), i.e. the reaction is irreversible.

(c) Mixed physical/chemical blowing agents: e.g. used to produce flexible polyurethane (PU) foams with very low densities. Both the chemical and physical blowing can be used in tandem to balance each other out with respect to thermal energy released/absorbed; hence, minimizing temperature rise. For instance, isocyanate and water (which react to form $CO_2$) are used in combination with liquid $CO_2$ (which boils to give gaseous form) in the production of very low density flexible PU foams for mattresses.

(d) Mechanically injected agents: Mechanically made foams involve methods of introducing bubbles into liquid polymerizable matrices (e.g. an unvulcanized elastomer in the form of a liquid latex). Methods include whisking-in air or other gases or low boiling volatile liquids in low viscosity lattices.

We have found that the above four mechanisms can all be used to create pores in the protecting polymer.

The polymer-protected anode active materials that are placed into the impacting chamber can contain those materials capable of storing lithium ions greater than 372 mAh/g, theoretical capacity of natural graphite. Examples of these high-capacity anode active materials are Si, Ge, Sn, $SnO_2$, $SiO_x$, $Co_3O_4$, etc. As discussed earlier, these materials, if implemented in the anode, have the tendency to expand and contract when the battery is charged and discharged. At the electrode level, the expansion and contraction of the anode active material can lead to expansion and contraction of the anode, causing mechanical instability of the battery cell. At the anode active material level, repeated expansion/contraction of particles of Si, Ge, Sn, $SiO_x$, $SnO_2$, $Co_3O_4$, etc. quickly leads to pulverization of these particles and rapid capacity decay of the electrode.

Thus, for the purpose of addressing these problems, the particles of solid anode active material may contain prelithiated particles. In other words, before the electrode active material particles (such as Si, Ge, Sn, $SnO_2$, $Co_3O_4$, etc.) are embedded in a polymer matrix (or encapsulated by a polymer coating) and then embraced by graphene sheets, these particles have already been previously intercalated with Li ions (e.g. via electrochemical charging).

In some embodiments, prior to the instant polymer embracing process, the particles of anode electrode active material contain particles that are pre-coated with a coating of a conductive material selected from carbon, pitch, carbonized resin, a conductive polymer, a conductive organic material, a graphene coating (e.g. graphene sheets), a metal coating, a metal oxide shell, or a combination thereof. The coating layer thickness is preferably in the range from 1 nm to 10 μm, preferably from 2 nm to 1 μm, and further preferably from 5 nm to 100 nm. This coating is implemented for the purpose of establishing a stable solid-electrolyte interface (SEI) to increase the useful cycle life of a lithium-ion battery.

In some embodiments, the particles of solid anode active material contain particles that are, prior to being coated with the protecting polymer, pre-coated with a carbon precursor material selected from a coal tar pitch, petroleum pitch, mesophase pitch, polymer, organic material, or a combination thereof so that the carbon precursor material resides between surfaces of the solid electrode active material particles and the graphite matrix, and the method further contains a step of heat-treating the graphite matrix-embraced, polymer-coated anode active material particles to convert the carbon precursor material, along with the coating polymer, to a carbon backbone material and pores, wherein the pores form empty spaces between surfaces of the solid anode active material particles and the graphite matrix and the carbon material chemically bonds the graphite flakes together. The carbon material can help to completely seal off the embracing graphite matrix to prevent direct contact of the embraced anode active material with liquid electrolyte, which otherwise continues to form additional SEI, thereby continuously consuming the lithium ions or solvent in the electrolyte, leading to rapid capacity decay.

In some embodiments, the particles of solid electrode active material contain particles pre-coated with a sacrificial material selected from a metal, pitch, polymer, organic material, or a combination thereof in such a manner that the sacrificial material resides between surfaces of solid electrode active material particles and the graphite matrix, and the method further contains a step of partially or completely removing the sacrificial material to form empty spaces between surfaces of the solid electrode active material particles and the graphite matrix. The empty spaces can accommodate the expansion of embraced active material particles without breaking the embraced particles.

In some embodiments, the method further comprises a step of exposing the graphite matrix-embraced carbon foam-protected anode active material to a liquid or vapor of a conductive material that is conductive to electrons and/or ions of lithium. This procedure serves to provide a stable SEI or to make the SEI more stable.

The particles of anode active material may be selected from the group consisting of: (A) lithiated and un-lithiated silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (B) lithiated and un-lithiated alloys or intermetallic compounds of Si, Ge, Sn, Pb, Sb, Bi, Zn, Al, Ti, Ni, Co, or Cd with other elements; (C) lithiated and un-lithiated oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites; (D) lithiated and un-lithiated salts and hydroxides of Sn; (E) lithium titanate, lithium manganate, lithium aluminate, lithium-containing titanium oxide, lithium transition metal oxide; and combinations thereof.

Anode active material particles may be encapsulated by using a micro-encapsulation procedure. The volume ratio of polymer-to-anode active material may be preferably from 0.3/1.0 to 5.0/1.0 and more preferably from 0.5/1.0 to 4.0/1.0.

Several micro-encapsulation processes require the polymer (e.g. elastomer prior to curing) to be dissolvable in a solvent. Fortunately, all the polymers used herein are soluble in some common solvents. Even for those rubbers that are not very soluble after vulcanization, the un-cured polymer (prior to vulcanization or curing) can be readily dissolved in a common organic solvent to form a solution. This solution can then be used to provide a polymer coating or matrix to embrace or embed therein the anode active particles via several of the micro-encapsulation methods to be discussed in what follows. Upon encapsulation, the polymer is then vulcanized or cured. Some examples of rubbers and their solvents are polybutadiene (2-methyl pentane+n-hexane or 2,3-dimethylbutane), styrene-butadiene rubber (toluene, benzene, etc.), butyl rubber (n-hexane, toluene, cyclohexane), etc. The SBR can be vulcanized with different amounts of sulfur and accelerator at 433° K in order to obtain different network structures and crosslink densities. Butyl rubber (IIR) is a copolymer of isobutylene and a small amount of isoprene (e.g. about 98% polyisobutylene with 2% isoprene distributed randomly in the polymer chain). Elemental sulfur and organic accelerators (such as thiuram or thiocarbamates) can be used to cross-link butyl rubber to different extents as desired. Thermoplastic elastomers are also readily soluble in solvents.

There are three broad categories of micro-encapsulation methods that can be implemented to produce polymer composite-encapsulated particles of an anode active material: physical methods, physico-chemical methods, and chemical methods. The physical methods include pan-coating, air-suspension coating, centrifugal extrusion, vibration nozzle, and spray-drying methods. The physico-chemical methods include ionotropic gelation and coacervation-phase separation methods. The chemical methods include interfacial polycondensation, interfacial cross-linking, in-situ polymerization, and matrix polymerization.

Pan-Coating Method:

The pan coating process involves tumbling the active material particles in a pan or a similar device while the encapsulating material (e.g. elastomer monomer/oligomer, polymer melt, polymer/solvent solution) is applied slowly until a desired encapsulating shell thickness is attained.

Air-Suspension Coating Method:

In the air suspension coating process, the solid particles (core material) are dispersed into the supporting air stream in an encapsulating chamber. A controlled stream of a polymer-solvent solution (e.g. elastomer or its monomer or oligomer dissolved in a solvent; or its monomer or oligomer alone in a liquid state) is concurrently introduced into this chamber, allowing the solution to hit and coat the suspended particles. These suspended particles are encapsulated (fully coated) with polymers while the volatile solvent is removed, leaving a thin layer of polymer (e.g. elastomer or its precursor, which is cured/hardened subsequently) on surfaces of these particles. This process may be repeated several times until the required parameters, such as full-coating thickness (i.e. encapsulating shell or wall thickness), are achieved. The air stream which supports the particles also helps to dry them, and the rate of drying is directly proportional to the temperature of the air stream, which can be adjusted for optimized shell thickness.

In a preferred mode, the particles in the encapsulating zone portion may be subjected to re-circulation for repeated coating. Preferably, the encapsulating chamber is arranged such that the particles pass upwards through the encapsulating zone, then are dispersed into slower moving air and sink back to the base of the encapsulating chamber, enabling repeated passes of the particles through the encapsulating zone until the desired encapsulating shell thickness is achieved.

Centrifugal Extrusion:

Anode active materials may be encapsulated using a rotating extrusion head containing concentric nozzles. In this process, a stream of core fluid (slurry containing particles of an anode active material dispersed in a solvent) is surrounded by a sheath of shell solution or melt. The suspension may also contain a conducting reinforcement material. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational Nozzle Encapsulation Method:

Core-shell encapsulation or matrix-encapsulation of an anode active material (along with a reinforcement material, for instance) can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·s): emulsions, suspensions or slurry containing the anode active material. The solidification can be done according to the used gelation system with an internal gelation (e.g. sol-gel processing, melt) or an external (additional binder system, e.g. in a slurry).

Spray-Drying:

Spray drying may be used to encapsulate particles of an active material when the active material is dissolved or suspended in a melt or polymer solution to form a suspension. The suspension may also contain an optional reinforcement material. In spray drying, the liquid feed (solution or suspension) is atomized to form droplets which, upon contacts with hot gas, allow solvent to get vaporized and thin polymer shell to fully embrace the solid particles of the active material.

Coacervation-Phase Separation:

This process consists of three steps carried out under continuous agitation:

(a) Formation of three immiscible chemical phases: liquid manufacturing vehicle phase, core material phase and encapsulation material phase. The core material is dispersed in a solution of the encapsulating polymer (elastomer or its monomer or oligomer). The encapsulating material phase, which is an immiscible polymer in liquid state, is formed by (i) changing temperature in polymer solution, (ii) addition of salt, (iii) addition of non-solvent, or (iv) addition of an incompatible polymer in the polymer solution.

(b) Deposition of encapsulation shell material: core material being dispersed in the encapsulating polymer solution, encapsulating polymer material coated around core particles, and deposition of liquid polymer embracing around core particles by polymer adsorbed at the interface formed between core material and vehicle phase; and (c) Hardening of encapsulating shell material: shell material being immiscible in vehicle phase and made rigid via thermal, cross-linking, or dissolution techniques.

Interfacial Polycondensation and Interfacial Cross-Linking:

Interfacial polycondensation entails introducing the two reactants to meet at the interface where they react with each other. This is based on the concept of the Schotten-Baumann reaction between an acid chloride and a compound containing an active hydrogen atom (such as an amine or alcohol), polyester, polyurea, polyurethane, or urea-urethane condensation. Under proper conditions, thin flexible encapsulating shell (wall) forms rapidly at the interface. A solution of the anode active material and a diacid chloride are emulsified in water and an aqueous solution containing an amine and a polyfunctional isocyanate is added. A base may be added to neutralize the acid formed during the reaction. Condensed polymer shells form instantaneously at the interface of the emulsion droplets. Interfacial cross-linking is derived from interfacial polycondensation, wherein cross-linking occurs between growing polymer chains and a multi-functional chemical groups to form an elastomer shell material.

In-Situ Polymerization:

In some micro-encapsulation processes, active materials particles are fully coated with a monomer or oligomer first. Then, direct polymerization of the monomer or oligomer is carried out on the surfaces of these material particles.

Matrix Polymerization:

This method involves dispersing and embedding a core material in a polymeric matrix during formation of the particles. This can be accomplished via spray-drying, in which the particles are formed by evaporation of the solvent from the matrix material. Another possible route is the notion that the solidification of the matrix is caused by a chemical change.

Extrusion and Pelletizing:

One may simply mix anode active material particles (with or without graphene sheets or other conducting material pre-embraced around the particles) and polymer together (through blending, melt mixing, or solution mixing) to form a mixture that is extruded out of an extruder slit or spinneret holes to form rods or filaments of an anode particle-embedded polymer composite. Upon solidification, the composite rods or filaments may be cut into smaller particles using pelletizer, ball mill, etc.

In some embodiments, the anode active material particles include powder, flakes, beads, pellets, spheres, wires, fibers, filaments, discs, ribbons, or rods, having a diameter or thickness from 2 nm to 20 μm. Preferably, the diameter or thickness is from 10 nm to 100 nm.

In certain embodiments, exfoliated graphite worms and/or expanded graphite flakes, along with primary particles of an anode active material, may be mixed and charged into a chamber of an impact energy device. The energy impacting apparatus may be a vibratory ball mill, planetary ball mill, high energy mill, basket mill, agitator ball mill, cryogenic ball mill, microball mill, tumbler ball mill, continuous ball mill, stirred ball mill, pressurized ball mill, attritor, plasma-assisted ball mill, freezer mill, vibratory sieve, bead mill, nanobead mill, ultrasonic homogenizer mill, centrifugal planetary mixer, vacuum ball mill, or resonant acoustic mixer. The energy impacting apparatus may be operated to produce graphite-embraced, polymer-protected anode particles. The embracing graphite matrix in this product comprises expanded graphite flakes that are typically thicker than 35 nm, in contrast to single-layer graphene or few-layer graphene that has a thickness approximately from 0.34 nm to 3.4 nm.

The following examples serve to provide the best modes of practice for the present invention and should not be construed as limiting the scope of the invention:

Example 1: Various Blowing Agents and Pore-Forming (Bubble-Producing) Processes

In the field of plastic processing, chemical blowing agents are mixed into the plastic pellets in the form of powder or pellets and dissolved at higher temperatures. Above a certain temperature specific for blowing agent dissolution, a gaseous reaction product (usually nitrogen or $CO_2$) is generated, which acts as a blowing agent.

Chemical foaming agents (CFAs) can be organic or inorganic compounds that release gasses upon thermal decomposition. CFAs are typically used to obtain medium- to high-density foams, and are often used in conjunction with physical blowing agents to obtain low-density foams. CFAs can be categorized as either endothermic or exothermic, which refers to the type of decomposition they undergo. Endothermic types absorb energy and typically release carbon dioxide and moisture upon decomposition, while the exothermic types release energy and usually generate nitrogen when decomposed. The overall gas yield and pressure of gas released by exothermic foaming agents is often higher than that of endothermic types. Endothermic CFAs are generally known to decompose in the range from 130 to 230° C. (266-446° F.), while some of the more common exothermic foaming agents decompose around 200° C. (392° F.). However, the decomposition range of most exothermic CFAs can be reduced by addition of certain compounds. The activation (decomposition) temperatures of CFAs fall into the range of our heat treatment temperatures. Examples of suitable chemical blowing agents include sodium bi-carbonate (baking soda), hydrazine, hydrazide, azodicarbonamide (exothermic chemical blowing agents), nitroso compounds (e.g. N, N-dinitroso pentamethylene tetramine), hydrazine derivatives (e.g. 4, 4'-Oxybis (benzenesulfonyl hydrazide) and hydrazo dicarbonamide), and hydrogen carbonate (e.g. sodium hydrogen carbonate). These are all commercially available in plastics industry.

Technically feasible blowing agents include carbon dioxide ($CO_2$), nitrogen ($N_2$), isobutane ($C_4H_{10}$), cyclopentane ($C_5H_{10}$), isopentane ($C_5H_{12}$), CFC-11 ($CFCl_3$), HCFC-22 ($CHF_2Cl$), HCFC-142b ($CF_2ClCH_3$), and HCFC-134a ($CH_2FCF_3$). However, in selecting a blowing agent, environmental safety is a major factor to consider. The Montreal Protocol and its influence on consequential agreements pose a great challenge for the producers of foam. Despite the effective properties and easy handling of the formerly applied chlorofluorocarbons, there was a worldwide agreement to ban these because of their ozone depletion potential (ODP). Partially halogenated chlorofluorocarbons are also not environmentally safe and therefore already forbidden in many countries. The alternatives are hydrocarbons, such as isobutane and pentane, and the gases such as $CO_2$ and nitrogen.

Except for those regulated substances, all the blowing agents recited above have been tested in our experiments. For both physical blowing agents and chemical blowing agents, the blowing agent amount introduced into the polymer, in terms of a blowing agent-to-polymer material weight ratio, is typically from 0/1.0 to 1.0/1.0, preferably from 0.2/1.0 to 0.8/1.0.

Example 2: Expanded Graphite Flake-Embraced, Carbon Foam-Protected Particles of Anode Active Materials Several types of anode active materials in a fine powder form were investigated. These include $Co_3O_4$, Si, Ge, $SiO_x$ (0<x<2), etc., which are used as examples to illustrate the best mode of practice. These active materials were either prepared in house or purchased from commercial sources. Primary particles of an anode active material were then dispersed in a polymer-solvent solution to form a slurry, which was spray-dried to form polymer-protected particulates, each containing one or a plurality of anode active particles embedded in a polymer matrix. The polymer-protected particulates were then subjected to a direct transfer or indirect transfer treatment for graphene sheet encapsulation of polymer-protected particles.

In a typical experiment, 1 kg of polymer-coated anode active material powder, 100 grams of expanded graphite flakes prepared in house using the conventional sulfuric acid-sodium nitrate intercalation/oxidation (4 hours) and thermal exfoliation (950° C. for 60 seconds), and milling balls ($ZrO_2$ balls) were placed in a high-energy ball mill container. The high-intensity ball mill was operated at 100 rpm for 4-7 hours. The container lid was then removed and particles of the active materials were found to be fully coated (embraced or encapsulated) with a layer of expanded graphite flakes having a layer thickness of 45 nm to 320 nm.

The expanded graphite flake-embraced, polymer-protected anode particles were then subjected to pyrolyzation at a carbonization temperature from 350° C. ramped up to 1,000° C. at a ramping rate of 10 degrees per minute and stayed at 1,000° C. for 2 hours.

Example 3: Reinforced Carbon Foam-Protected Sn, $SiO_x$, and Ge Particles

The process of Example 2 was replicated with the inclusion of a reinforcement material (high strength material) in the polymer. Examples of the reinforcement material used in this study include graphene oxide sheets, expanded graphite flakes, and CNTs. Primary particles of an anode active material and a reinforcement material were then dispersed in a polymer-solvent solution to form a slurry, which was extruded and pelletized to form polymer composite-protected particulates, each containing one or a plurality of anode active particles embedded in a polymer matrix composite. The polymers used in the present study were water soluble polymers, including polyvinyl pyrrolidone (PVP), polyvinyl alcohol (PVA), and polyacrylic acid (PAA), and the solvent used was water. In the case of PAA, baking soda was used as a blowing agent.

The polymer composite-protected anode particles were then subjected to pyrolyzation at an initial temperature of 150° C., which was then gradually ramped up to a carbonization temperature from 700-1,500° C.

Example 4: Exfoliated Graphite Worm-Embraced Carbon Foam-Protected $SnO_2$ Particles In an experiment, 4 grams of phenolic resin-coated tin oxide powder (90 nm diameter), 0.3 grams of exfoliated graphite worms (procedure as illustrated in FIG. 1), and 1 gram of $ZrO_2$ balls were placed in a ball mill and processed for 2 hours. Typically, multiple resin-coated $SnO_2$ particles were embedded in exfoliated graphite worm matrix and the resulting particulates were found to be typically ellipsoidal or potato-like shape. The polymer composite-protected anode particles were then subjected to pyrolyzation at an initial temperature of 150° C., which was then gradually ramped up to a carbonization temperature of 1,200° C.

Example 5: Expanded Graphite Flake-Encapsulated Reinforced Carbon Foam-Protected Si Micron Particles In a first experiment, 500 g of graphene oxide-reinforced PVA-protected Si powder (particle diameter ~3 μm), 50 grams of expanded graphite flakes, and 100 grams of $ZrO_2$ balls were placed in a high-intensity ball mill. The mill was operated for 0.5-4 hours, after which the container lid was opened. The PVA resin-coated Si powder was coated with a dark layer of expanded graphite flakes, typically 67 nm to 1.5 μm in layer thickness depending on the ball-milling time.

In a second experiment, micron-scaled Si particles from the same batch were pre-coated with a layer of multi-walled CNT reinforced polyethylene (PE) using a micro-encapsulation method that includes preparing solution of PE dissolved in toluene, dispersing Si particles and CNTs in this solution to form a slurry, and spry-drying the slurry to form reinforced PE-encapsulated Si particles. Then, 500 g of CNT-reinforced PE-encapsulated Si particles and 50 grams of expanded graphite flakes were placed in a high-intensity ball mill. The mill was operated for 20 minutes-2 hours. The PE-encapsulated Si particles (PE layer varied from 0.3 to 2.0 µm) were now also embraced with expanded graphite flakes. These expanded graphite flake-embraced reinforced PE-encapsulated particles (with 0.5% by weight CNTs as a reinforcement material) were then subjected to a heat treatment (up to 900° C.) that converted PE to carbon. The converted carbon was formed into a reinforced, porous 3D carbon foam structure connecting the Si particle surface with the encapsulating shell of expanded graphite flakes. Such a strategy leads to dramatically improved battery cycle life.

Example 6: Graphite Worm-Embraced Carbon Foam-Protected Ge Particles (Using Exfoliated Mesocarbon Microbeads or MCMBs as the Exfoliated Artificial Graphite Worms)

The MCMB beads, supplied from China Steel Chemical Co., Taiwan, were intercalated with sulfuric acid/$NaClO_3$ and exfoliated at 600° C. for 45 seconds.) In one example, 500 grams of B-doped Ge powder (anode active material) protected by polyurethane resin and 10 grams of exfoliated MCMBs were placed in a ball mill (with milling balls), and processed for 3 hours. The resulting product was particulates containing graphite worms having PU-protected Ge particles embedded therein. These particulates were then heat treated by heating the material from room temperature gradually to 900° C. at a rate of approximately 20 degrees per minutes and then stayed at 900° C. for 2 hours.

Example 7: Preparation and Electrochemical Testing of Various Battery Cells

For most of the anode and cathode active materials investigated, we prepared lithium-ion cells or lithium metal cells using the conventional slurry coating method. A typical anode composition includes 85 wt. % active material (e.g., graphite matrix-encapsulated, carbon foam-protected Si or $Co_3O_4$ particles), 7 wt. % acetylene black (Super-P), and 8 wt. % polyvinylidene fluoride binder (PVDF, 5 wt. % solid content) dissolved in N-methyl-2-pyrrolidinoe (NMP). After coating the slurries on Cu foil, the electrodes were dried at 120° C. in vacuum for 2 h to remove the solvent. Cathode layers are made in a similar manner (using Al foil as the cathode current collector) using the conventional slurry coating and drying procedures. An anode layer, separator layer (e.g. Celgard 2400 membrane), and a cathode layer are then laminated together and housed in a plastic-Al envelop. The cell is then injected with 1 M $LiPF_6$ electrolyte solution dissolved in a mixture of ethylene carbonate (EC) and diethyl carbonate (DEC) (EC-DEC, 1:1 v/v). In some cells, ionic liquids were used as the liquid electrolyte. The cell assemblies were made in an argon-filled glove-box.

The cyclic voltammetry (CV) measurements were carried out using an Arbin electrochemical workstation at a typical scanning rate of 1 mV/s. In addition, the electrochemical performances of various cells were also evaluated by galvanostatic charge/discharge cycling at a current density of from 50 mA/g to 10 A/g. For long-term cycling tests, multi-channel battery testers manufactured by LAND were used.

In lithium-ion battery industry, it is a common practice to define the cycle life of a battery as the number of charge-discharge cycles that the battery suffers 20% decay in capacity based on the initial capacity measured after the required electrochemical formation.

FIG. 4 shows the charge-discharge cycling behaviors of 2 lithium cells featuring $Co_3O_4$ particle-based anodes: one cell containing graphite-embraced $Co_3O_4$ particles (no carbon foam connecting graphite layer and anode active particles; substantially no pores) and the other cell containing expanded graphite-encapsulated, carbon foam-protected $Co_3O_4$ particles produced by the instant impact transfer method (having a pore/anode particle volume ratio of 1.2/1.0). It is clear that the presently invented graphite-encapsulated, carbon foam-protected $Co_3O_4$ particles exhibit significantly more stable battery cycle behavior. The cell containing graphite-encapsulated $Co_3O_4$ particles (no carbon foam) has a cycle life of approximately 340 cycles, at which the capacity suffers a 20% decay. In contrast, the cell featuring the graphene-encapsulated, carbon foam-protected $Co_3O_4$ particles prepared according to the instant invention experiences only a 8.54% reduction in capacity after 620 cycles. Thus, the cycle life is expected to exceed 1,500 cycles. We have further observed that, in general, a higher pore-to-anode active material ratio leads to a longer cycle life until when the ratio reaches approximately 1.9/1.0 for the $Co_3O_4$ particle-based electrode.

Figure 5:
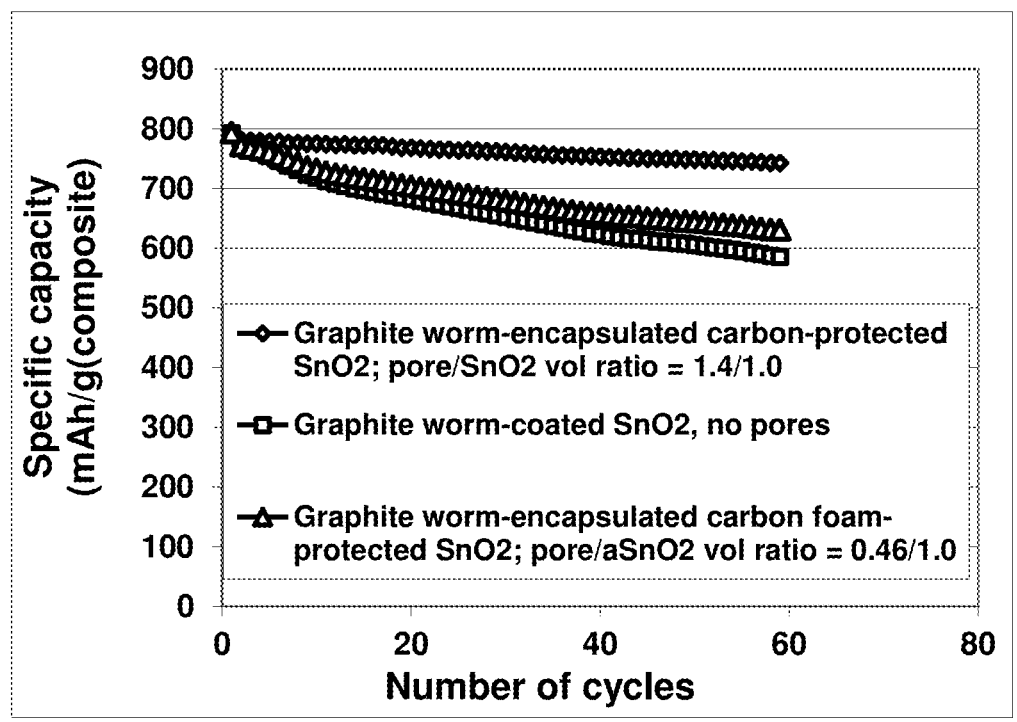
FIG. 5 The specific capacity values of 3 lithium-ion cells having $SnO_2$ particles as the an anode active material: one cell featuring exfoliated graphite worm-encapsulated $SnO_2$ particles having no pores between encapsulating exfoliated graphite worm layer and $SnO_2$ particles; second cell having a carbon foam between the encapsulating exfoliated graphite worm layer and $SnO_2$ particles with a pore-to-$SnO_2$ volume ration of 0.46/1.0; third cell having a carbon foam between the encapsulating graphene sheets and $SnO_2$ particles with a pore-to-$SnO_2$ volume ration of 1.4/1.0.

Shown in FIG. 5 are the charge-discharge cycling behaviors (specific capacity) of 3 lithium-ion cells each having $SnO_2$ particles as the an anode active material: one cell featuring exfoliated graphite worm-encapsulated $SnO_2$ particles having no pores between encapsulating graphite worm layer and $SnO_2$ particles; second cell having a carbon foam between the encapsulating exfoliated graphite worms and $SnO_2$ particles with a pore-to-$SnO_2$ volume ration of 0.46/1.0; third cell having a carbon foam between the encapsulating exfoliated graphite worms and $SnO_2$ particles with a pore-to-$SnO_2$ volume ration of 1.4/1.0. The presently invented strategy of implementing not only embracing exfoliated graphite worms but also carbon foam connecting the graphite worms and the anode active material particles imparts a much stable cycle life to a lithium-ion battery. Again, a higher pore-to-anode active material ratio leads to a longer cycle life until when the ratio reaches approximately 2.2/1.0 for the $SnO_2$ particle-based anode.

Figure 6:
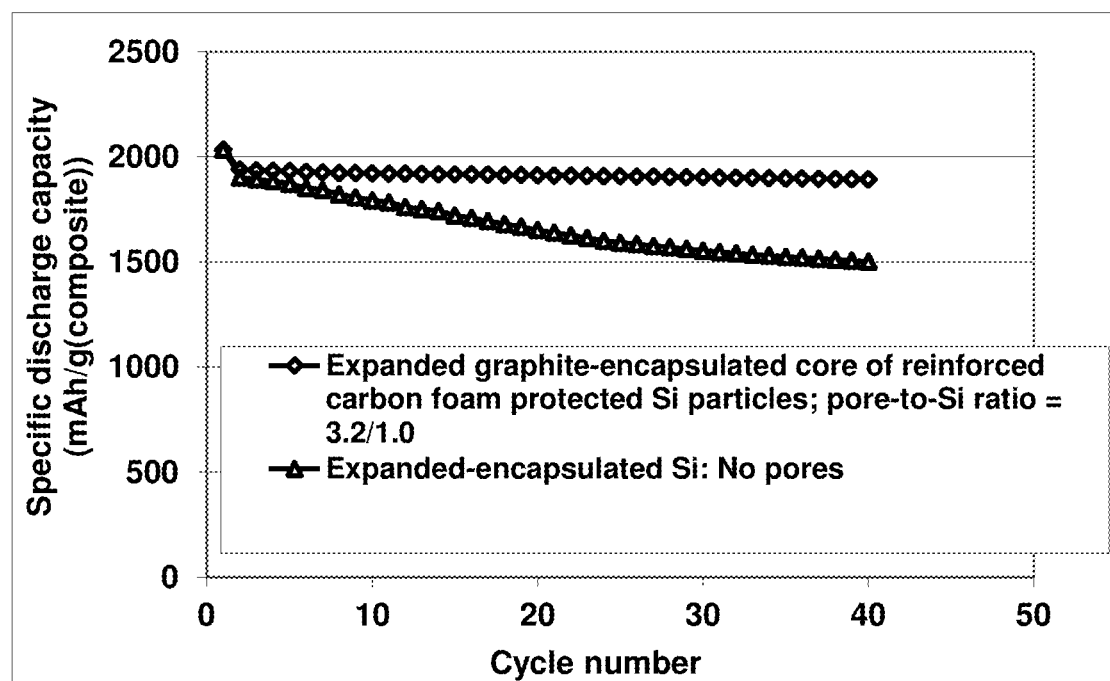
FIG. 6 The specific capacity values of 2 lithium-ion cells each featuring micron-scaled (3 μm) Si particle-based anodes: one cell containing expanded graphite flake-embraced Si particles (but no carbon foam), and the other cell containing expanded graphite flake-encapsulated, CNT-reinforced carbon foam protected graphene-coated Si particles. The pore-to-Si volume ratio is approximately 3.2/1.0.

Shown in FIG. 6 are the charge-discharge cycling behaviors of 2 lithium-ion cells featuring micron-scaled (3 µm) Si particle-based anodes: one cell containing expanded graphite flake-embraced Si particles (but no carbon foam), and the other cell containing expanded graphite flake-encapsulated, CNT-reinforced carbon foam protected graphene-coated Si particles. The pore-to-Si volume ratio is approximately 3.2/1.0. Again, the invented strategy leads to very stable cycling behavior.

Figure 7:
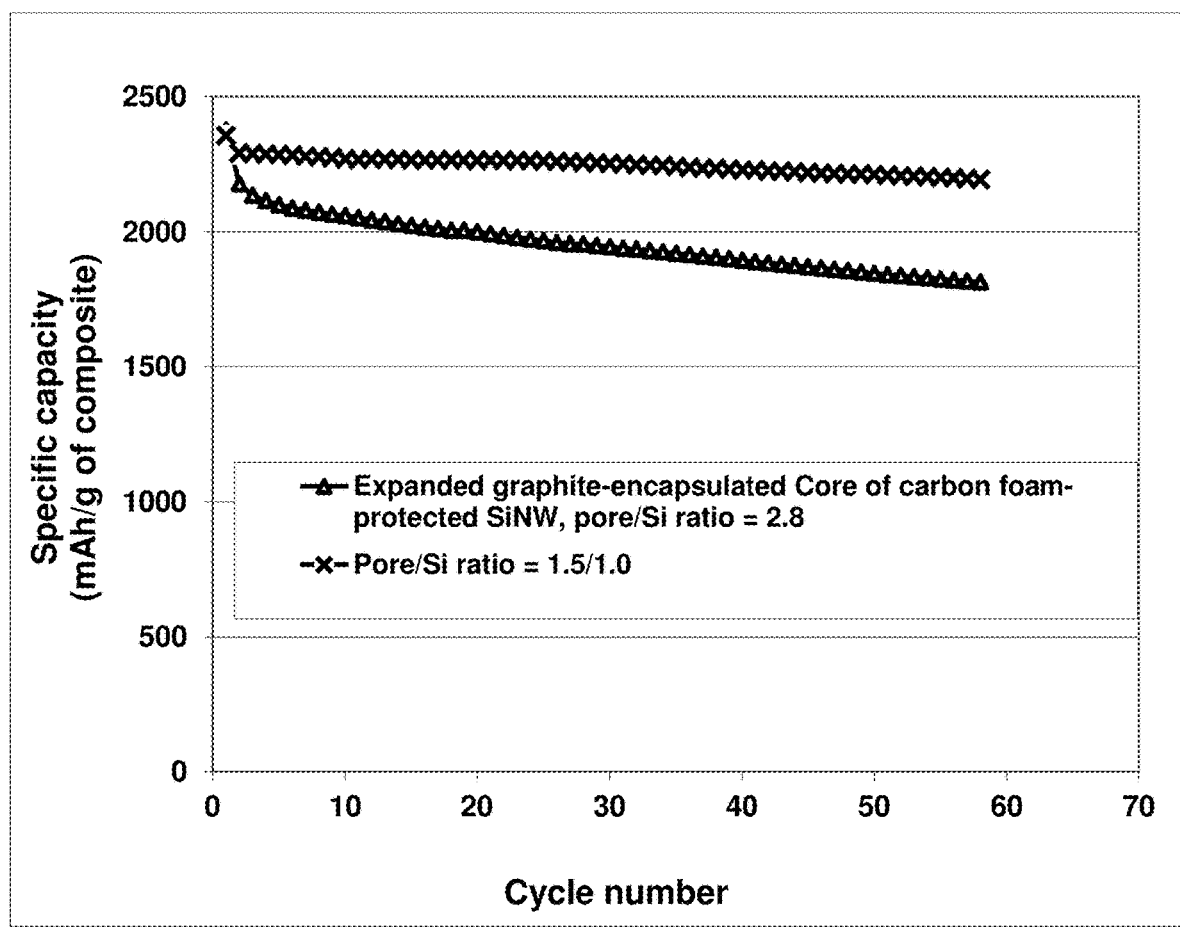
FIG. 7 Specific capacities of 2 lithium-ion cells having a core of Si nanowires (SiNW) embedded in an expanded graphite flake-reinforced carbon foam matrix having a pore-to-Si volume ratio of 2.8/1.0 and the other a pore-to-Si volume ratio of 1.5/1.0.

Summarized in FIG. 7 are the specific capacities of 2 lithium-ion cells each having a core of Si nanowires (SiNW) embedded in an expanded graphite flake-reinforced carbon foam matrix derived from a reinforced phenolic resin: one having a pore-to-Si volume ratio of 2.8/1.0 and the other a pore-to-Si volume ratio of 1.5/1.0. This result demonstrates the effectiveness of implementing an adequate amount of pores to accommodate the volume expansion of an anode active material to ensure cycling stability of a lithium-ion battery featuring a high-capacity anode active material, such as Si. We have further observed that a reinforcement material (e.g. expanded graphite flakes, graphene sheets and CNTS) in the carbon matrix also helps to maintain the structural integrity of the carbon foam matrix against the repeated volume expansion/shrinkage of the anode active material particles.

Figure 8:
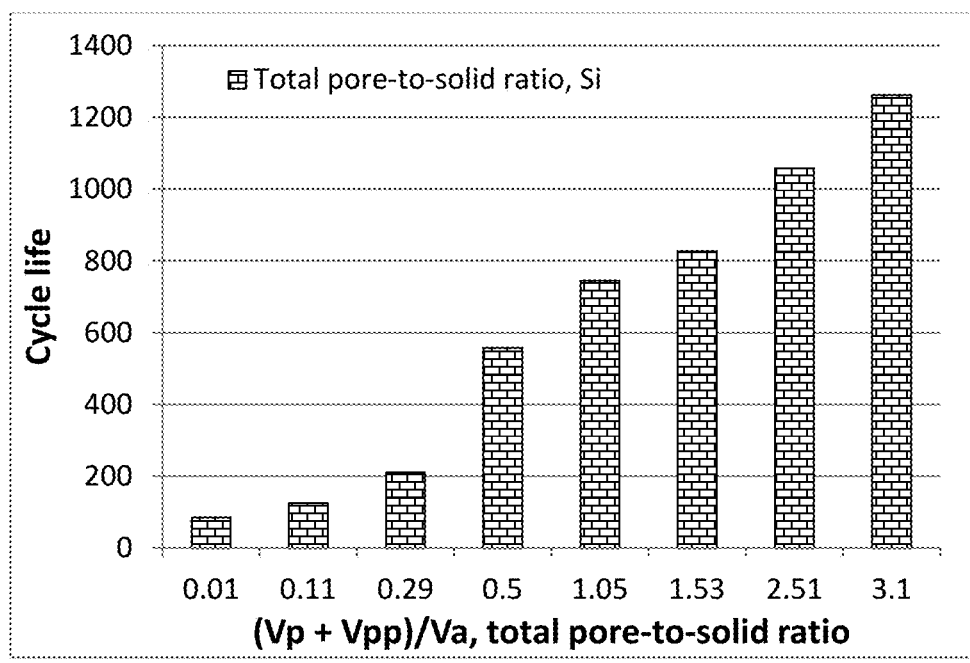
FIG. 8 Cycle life of lithium-ion cell containing expanded graphite flake-encapsulated, CNT-reinforced carbon foam protected porous Si particles, plotted as a function of the total pore-to-solid ratio in the particulate.
Figure 9:
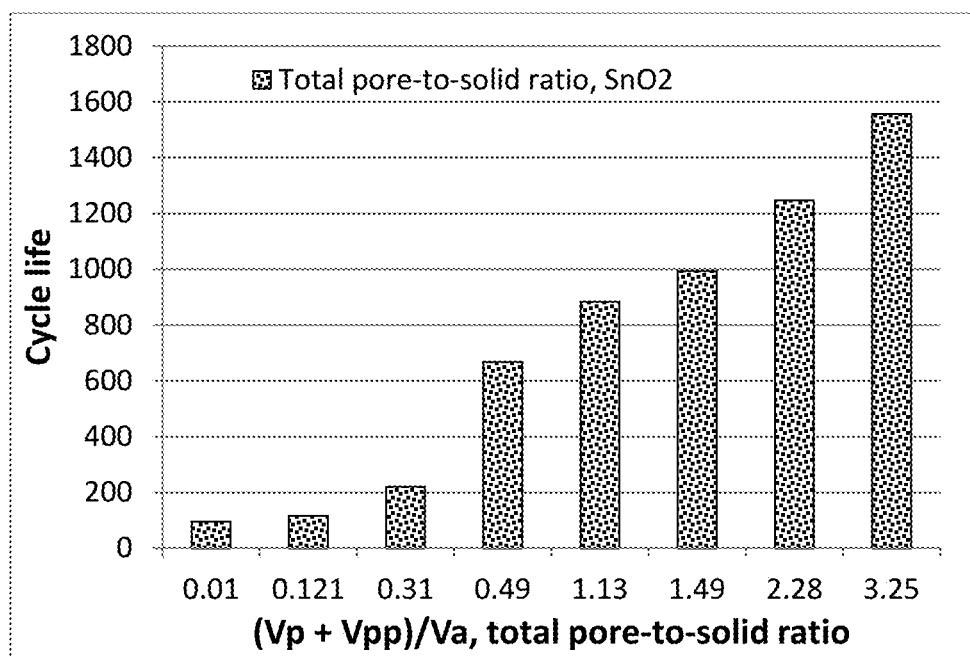
FIG. 9 Cycle life of lithium-ion cell containing expanded graphite flake-encapsulated, graphene-reinforced carbon foam protected porous $SnO_2$ particles, plotted as a function of the total pore-to-solid ratio in the particulate.

The effects of the total pore-to-solid anode active material ratio in the invented particulates may be illustrated in FIG. 8 and FIG. 9. FIG. 8 shows the cycle life of a lithium-ion cell containing expanded graphite flake-encapsulated, CNT-reinforced carbon foam protected porous Si particles, plotted as a function of the total pore-to-solid ratio in the particulate. FIG. 9 shows the cycle life of a lithium-ion cell containing graphene-reinforced carbon foam protected porous $SnO_2$ particles, plotted as a function of the total pore-to-solid ratio in the particulate. These data have demonstrated the significance of the total pore volume in impacting the cycle life of a lithium battery. Typically, there is a threshold total pore volume-to-total solid volume ratio above which a dramatic increase in cycle life is observed.

The invention claimed is:

1. An anode particulate for a lithium battery, said particulate comprising a graphite matrix and a single or a plurality of carbon foam-protected primary particles of an anode active material embedded or dispersed in said graphite matrix, wherein said primary particles of anode active material contain at least one porous particle having a surface pore, internal pore, or both surface and internal pores, having a pore volume of Vpp and a solid volume Va, said carbon foam contains pores having a pore volume Vp, and the volume ratio Vp/Va is from 0.1/1.0 to 10/1.0 or a total pore-to-solid volume ratio (Vp+Vpp)/Va is from 0.3/1.0 to 20/1.0 and wherein the carbon foam is physically or chemically connected to said graphite matrix and said primary particles of the anode active material.

2. An anode particulate for a lithium battery, said particulate comprising a single or a plurality of carbon foam-protected primary particles of an anode active material, wherein said primary particles of anode active material contain at least one porous particle having a surface pore, internal pore, or both surface and internal pores, having a pore volume of Vpp and a solid volume Va, said carbon foam contains pores having a pore volume Vp, and the volume ratio Vp/Va is from 0.1/1.0 to 10/1.0 or a total pore-to-solid volume ratio (Vp+Vpp)/Va is from 0.3/1.0 to 20/1.0 and wherein the carbon foam is physically or chemically connected to said graphite matrix and said primary particles of the anode active material and the carbon foam is reinforced with a high-strength material selected from carbon nanotubes, carbon nanofibers, carbon or graphite fibers, graphene sheets, expanded graphite flakes, polymer fibrils, glass fibers, ceramic fibers, metal filaments or metal nanowires, whiskers, or a combination thereof.

3. The anode particulate of claim 1, wherein said graphite matrix comprises expanded graphite flakes, natural graphite flakes, exfoliated graphite worms, artificial graphite particles, sol-gel graphite, polymer-derived graphite platelets, graphitized CVD carbon, or a combination thereof.

4. The anode particulate of claim 3, wherein said graphite matrix further comprises a binder that bonds together said expanded graphite flakes, natural graphite flakes, artificial graphite particles, sol-gel graphite, polymer-derived graphite platelets, graphitized CVD carbon, or a combination thereof to prevent a direct contact between a liquid electrolyte and said primary particles of the anode active material.

5. The anode particulate of claim 4, wherein said binder comprises a material selected from a polymer including a conducting or non-conducting polymer, polymeric carbon or carbonized resin, amorphous carbon, pitch, CVD carbon, metal, or a combination thereof.

6. The anode particulate of claim 1, wherein said carbon foam is reinforced with a high-strength material selected from carbon nanotubes, carbon nanofibers, carbon or graphite fibers, graphene sheets, expanded graphite flakes, polymer fibrils, glass fibers, ceramic fibers, metal filaments or metal nanowires, whiskers, or a combination thereof.

7. The anode particulate of claim 1, wherein said carbon foam contains from 0.1% to 20% by weight of carbon based on the total weight of said particulate.

8. The anode particulate of claim 1, wherein said anode active material is selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li having at least 60% by weight of lithium element therein; and (h) combinations thereof.

9. An anode particulate for a lithium battery, said particulate comprising a graphite matrix and a single or a plurality of carbon foam-protected primary particles of an anode active material embedded or dispersed in said graphite matrix, wherein said primary particles of anode active material contain at least one porous particle having a surface pore, internal pore, or both surface and internal pores, having a pore volume of Vpp and a solid volume Va, said carbon foam contains pores having a pore volume Vp, and the volume ratio Vp/Va is from 0.1/1.0 to 10/1.0 or a total pore-to-solid volume ratio (Vp+Vpp)/Va is from 0.3/1.0 to 20/1.0 and wherein the carbon foam is physically or chemically connected to said graphite matrix and said primary particles of the anode active material, wherein said anode active material is selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li having at least 60% by weight of lithium element therein; and (h) combinations thereof, wherein said Li alloy contains from 0.1% to 10% by weight of a metal element selected from Zn, Ag, Au, Mg, Ni, Ti, Fe, Co, V, or a combination.

10. The anode particulate of claim 1, wherein said anode active material contains a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, lithium titanate, or a combination thereof, wherein x=1 to 2.

11. The anode particulate of claim 1, wherein said anode active material is in a form of nanoparticle, nanowire, nanofiber, nanotube, nanosheet, nanobelt, nanoribbon, nanodisc, nanoplatelet, or nanohorn having a thickness or diameter from 0.5 nm to 100 nm.

12. The anode particulate of claim 1, wherein at least one of said primary particles of anode active material is coated with a layer of carbon or graphene disposed between said particle and said carbon foam.

13. A mass of anode particulates containing the anode particulate of claim 1.

14. A battery anode containing said particulate of claim 1.

15. A battery containing the battery anode of claim 14.

16. The battery of claim 15, wherein said battery is a lithium-ion battery, lithium metal secondary battery, lithium-sulfur battery, lithium-air battery, or lithium-selenium battery.

17. A method of producing multiple particulates containing said anode particulate of claim 1, said method comprising:
a) Providing multiple polymer-coated primary particles of an anode active material, wherein said polymer comprises a carbon precursor material having a carbon yield from 0.1% to 70% by weight;
b) combining said polymer-coated anode active material particles with a graphite matrix material to produce graphite matrix-embraced polymer-coated anode active material particles; and
c) thermally converting said polymer in said polymer-coated particles into a porous carbon matrix or carbon foam to obtain said multiple particulates.

18. A method of producing multiple particulates containing said anode particulate of claim 1, said method comprising:
A) Providing multiple polymer-coated primary particles of an anode active material, wherein said polymer comprises a carbon precursor material having a carbon yield from 0.1% to 70% by weight;
B) thermally converting said polymer in said polymer-coated particles into a porous carbon matrix or carbon foam to obtain carbon foam-protected primary particles of an anode active material; and
C) combining said carbon foam-protected primary particles of anode active material particles with a graphite matrix material to produce said multiple particulates.

19. The method of claim 17, wherein said polymer contains a blowing agent, a reinforcement material, or both dispersed therein.

20. The method of claim 18, wherein said polymer contains a blowing agent, a reinforcement material, or both dispersed therein.

21. The method of claim 17, wherein said step (a) includes operating a procedure selected from pan-coating, air-suspension coating, centrifugal extrusion, vibration-nozzle encapsulation, spray-drying, coacervation-phase separation, interfacial polycondensation and interfacial cross-linking, in-situ polymerization, matrix polymerization, extrusion and pelletizing, or a combination thereof to produce said multiple polymer-coated primary particles of an anode active material.

22. The method of claim 17, wherein said polymer-coated anode active material particles comprise a polymer selected from a thermoplastic, thermoset resin, rubber or elastomer, filled or reinforced polymer, interpenetrating polymer network, biopolymer, pitch, sugar, starch, or a combination thereof.

23. The method of claim 17, wherein said step (b) comprises operating (i) an air-jet milling procedure to embrace said polymer-coated anode active material particles with natural flake graphite matrix material or (ii) a ball milling procedure to embrace said polymer-coated anode active material particles with expanded graphite flakes or exfoliated graphite worms.

24. The method of claim 18, wherein said step (c) comprises operating a ball milling procedure to embrace said carbon foam-protected primary particles of anode active material with expanded graphite flakes.

25. The method of claim 23, wherein said ball milling operating procedure comprises operating an apparatus selected from a vibratory ball mill, planetary ball mill, high energy mill, basket mill, agitator ball mill, cryogenic ball mill, microball mill, tumbler ball mill, continuous ball mill, stirred ball mill, pressurized ball mill, attritor, plasma-assisted ball mill, freezer mill, vibratory sieve, bead mill, nanobead mill, ultrasonic homogenizer mill, centrifugal planetary mixer, vacuum ball mill, or resonant acoustic mixer.

26. The method of claim 24, wherein said ball milling operating procedure comprises operating an apparatus selected from a vibratory ball mill, planetary ball mill, high energy mill, basket mill, agitator ball mill, cryogenic ball mill, microball mill, tumbler ball mill, continuous ball mill, stirred ball mill, pressurized ball mill, attritor, plasma-assisted ball mill, freezer mill, vibratory sieve, bead mill, nanobead mill, ultrasonic homogenizer mill, centrifugal planetary mixer, vacuum ball mill, or resonant acoustic mixer.

27. The method of claim 18, further comprising a step of incorporating said particulate into a battery anode electrode.

28. The method of claim 17, wherein said particles of anode active material contain prelithiated particles having 0.1% to 54.7% by weight of lithium ions preloaded into said particles prior to step (a) of mixing.

29. The method of claim 17, wherein said step (a) comprises a step of pre-coating primary particles of anode active material with a layer of conductive material selected from a carbon, pitch, carbonized resin, conductive polymer, conductive organic material, metal coating, metal oxide shell, graphene, or a combination thereof, prior to coating said primary particles with a polymer.

30. The method of claim 17, further comprising a step of exposing said multiple particulates to a liquid or vapor of a conductive material that is conductive to electrons and/or ions of lithium.

31. The method of claim 17, wherein said particles of anode active material are selected from the group consisting of:
(A) lithiated and un-lithiated silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd);
(B) lithiated and un-lithiated alloys or intermetallic compounds of Si, Ge, Sn, Pb, Sb, Bi, Zn, Al, Ti, Ni, Co, or Cd with other elements;
(C) lithiated and un-lithiated oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites;

(D) lithiated and un-lithiated salts and hydroxides of Sn;
(E) lithium titanate, lithium manganate, lithium aluminate, lithium-containing titanium oxide, lithium transition metal oxide;
and combinations thereof.

32. The method of claim 17, wherein said anode active material particles include powder, flakes, beads, pellets, spheres, wires, fibers, filaments, discs, ribbons, or rods, having a diameter or thickness from 2 nm to 20 µm.

* * * * *